US010607336B2

(12) United States Patent
Honma

(10) Patent No.: US 10,607,336 B2
(45) Date of Patent: Mar. 31, 2020

(54) IMAGE FORMING SYSTEMS AND NON-TRANSITORY RECORDING MEDIUM STORING A COMPUTER-READABLE PROGRAM INSPECTING OUTPUT IMAGE BY DISTRIBUTED PROCESSING

(71) Applicant: KONICA MINOLTA, INC., Tokyo (JP)

(72) Inventor: Mikimasa Honma, Tokyo (JP)

(73) Assignee: Konica Minolta, Inc., Chiyoda-ku, Tokyo (JP)

( * ) Notice: Subject to any disclaimer, the term of this patent is extended or adjusted under 35 U.S.C. 154(b) by 0 days.

(21) Appl. No.: 16/129,390

(22) Filed: Sep. 12, 2018

(65) Prior Publication Data

US 2019/0122351 A1 Apr. 25, 2019

(30) Foreign Application Priority Data

Oct. 20, 2017 (JP) ................. 2017-203740

(51) Int. Cl.
*G06F 15/177* (2006.01)
*G06T 7/00* (2017.01)
*G06T 7/11* (2017.01)
*G06F 3/12* (2006.01)

(52) U.S. Cl.
CPC .............. *G06T 7/001* (2013.01); *G06F 3/124* (2013.01); *G06F 3/1208* (2013.01); *G06F 3/1259* (2013.01); *G06F 3/1285* (2013.01); *G06F 3/1288* (2013.01); *G06T 7/11* (2017.01); *G06F 3/1204* (2013.01); *G06F 3/1215* (2013.01); *G06T 2207/30144* (2013.01)

(58) Field of Classification Search
CPC ... G06T 7/001; G06T 7/10; G06T 7/11; G06T 2207/30122; G06F 11/0709; G06F 2009/4557; G06F 3/0418
USPC ................. 358/1.15, 3.26, 504; 382/112
See application file for complete search history.

(56) References Cited

U.S. PATENT DOCUMENTS

| 5,953,990 | A | * | 9/1999 | Chalmers | ............. | H04N 1/4078 101/211 |
| 2002/0164077 | A1 | * | 11/2002 | Lee | ...................... | G06K 9/4604 382/224 |
| 2006/0197966 | A1 | * | 9/2006 | Viturro | ................ | H04N 1/6055 358/1.9 |
| 2018/0108122 | A1 | | 4/2018 | Fukase | | |

* cited by examiner

*Primary Examiner* — Jamares Q Washington
(74) *Attorney, Agent, or Firm* — Buchanan Ingersoll & Rooney PC

(57) ABSTRACT

An image forming system in which distributed processing of a job is performed by a plurality of image forming apparatuses and each of the image forming apparatuses inspects an output image formed on paper by distributed processing. Among the image forming apparatuses which perform distributed processing, one or more image forming apparatuses generate data for abnormal image detection which is required to inspect the output image in the image forming apparatuses to perform the distributed processing.

13 Claims, 15 Drawing Sheets

ORIGINAL IMAGE     READ OUTPUT IMAGE

ORIGINAL IMAGE     READ OUTPUT IMAGE

FIG. 3
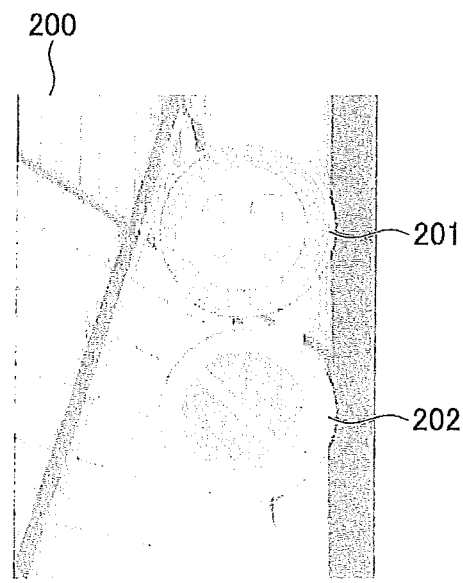
ORIGINAL IMAGE
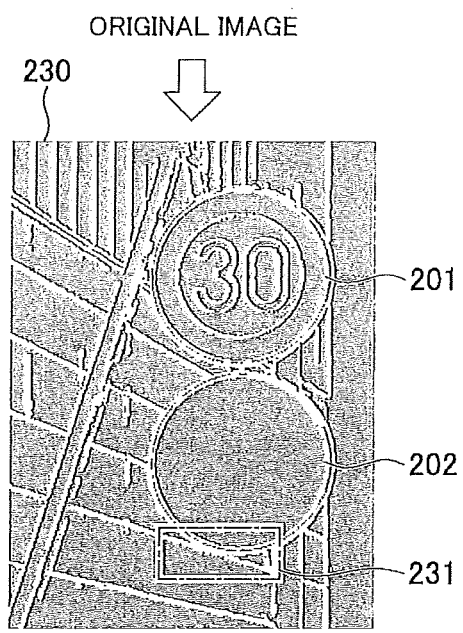
EDGE IMAGE
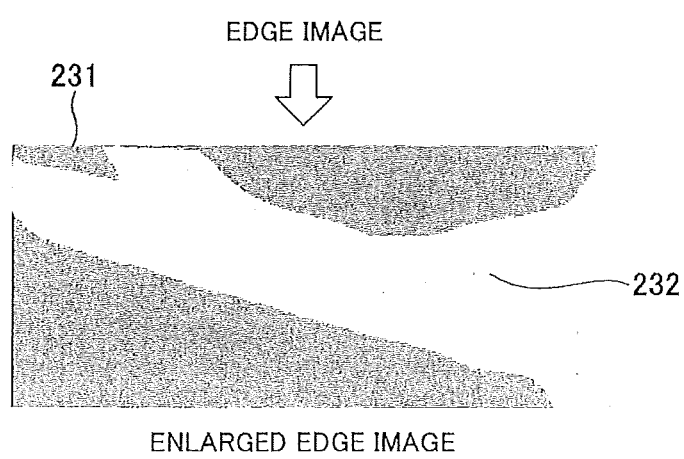
ENLARGED EDGE IMAGE

FIG. 6

TANDEM SETUP (ENTRY OF PARTNER IP ADDRESS)

YOU CAN CHANGE ENTERED ADDRESS.

ENTRY OF PARTNER IP ADDRESS

| IPv4 ADDRESS | 010. 09. 075. 080 |

60a

```
1 2 3
4 5 6
7 8 9   RESET
0       ENTER
```

CANCEL    OK

FIG. 7

OUTPUT SETUP

PLEASE SELECT OUTPUT FEATURES.

| 2-SIDED BINDING | OUTPUT ORIENTATION /OUTPUT ORDER | POST-PROCESSING |

- LEFT/RIGHT BINDING
- TOP BINDING

- FACE UP
- FACE DOWN
- FORWARD
- REVERSE

- RING BIND
- SORTING
- SORT
- GROUPING
- GROUP
- TANDEM  (61a)

RESET    CANCEL    OK

FIG. 13

| APPARATUS | RESERVED JOB | CPU PERFORMANCE | READING UNIT | PRINT SPEED (PPM) |
|---|---|---|---|---|
| A | NO | MIDDLE | AVAILABLE | MIDDLE |
| B | YES | HIGH | AVAILABLE | HIGH |
| C | NO | HIGH | AVAILABLE | HIGH |
| D | YES | LOW | UNAVAILABLE | LOW |

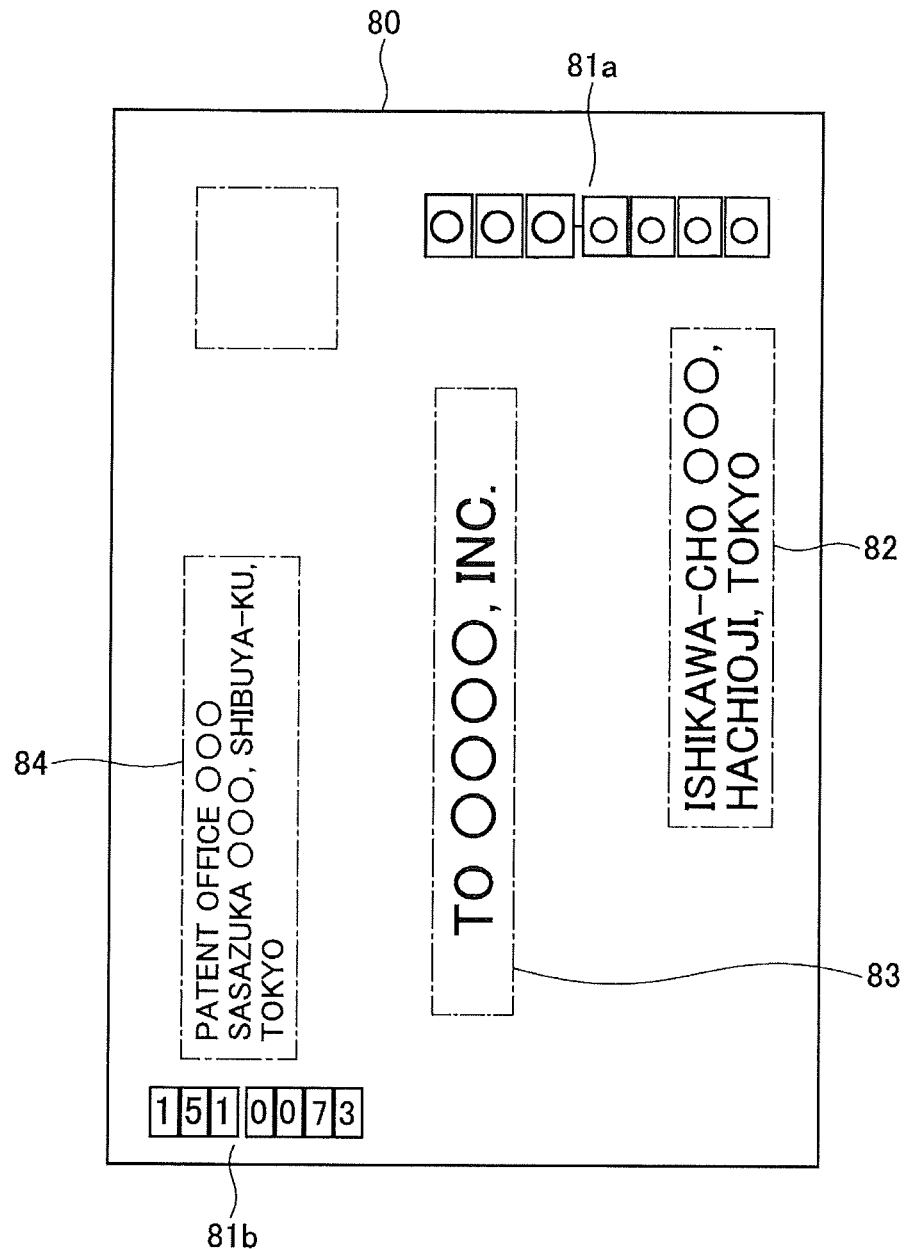

IMAGE FORMING SYSTEMS AND NON-TRANSITORY RECORDING MEDIUM STORING A COMPUTER-READABLE PROGRAM INSPECTING OUTPUT IMAGE BY DISTRIBUTED PROCESSING

CROSS-REFERENCE TO RELATED APPLICATIONS

The entire disclosure of Japanese Patent Application No. 2017-203740, filed on Oct. 20, 2017, is incorporated herein by reference in its entirety.

BACKGROUND

Technological Field

The present invention relates to an image forming system including a plurality of image forming apparatuses which, after output of an image on paper, inspect the image, and a non-transitory recording medium storing a computer-readable program.

Description of the Related Art

In the past, a technique has been known in which the paper on which an image has been printed by an image forming apparatus according to a job is read by a reader installed at the back side of the image forming apparatus and compared against data for abnormal image detection as a reference to determine whether or not the image is abnormal and then subsequent printing is stopped or reprinting is done. This kind of technique is called spoilage detection.

Generally, an image is determined as abnormal in the following cases: the image obtained by reading an output image formed on paper (hereinafter called "read output image") is stained; the printed content is incorrect; the paper and output image are considerably misaligned, and the like. One method for determining whether or not the image is abnormal is as follows: the density or brightness of a given pixel and a peripheral pixel in each of the original image of the job and the read output image is calculated and if the difference exceeds the threshold, the image is determined as abnormal.

FIG. 1 is an explanatory drawing which shows an example of an original image and a read output image. The arrows denote the scanning direction (direction of difference comparison). In the original image 200 shown in FIG. 1, circular road signs 201 and 202 are arranged vertically. In the image forming apparatus, the original image 200 and the read output image 210 after job output (output image on paper S) are compared and if there is a difference between corresponding pixels, the output image is determined as an abnormal image which contains a line 213 and stain 214.

However, when comparison is made only between the read output image and the original image, the image may be determined as an abnormal image if the printing position is not aligned with the paper edge or if the image magnification ratio has changed due to shrinkage of the paper, etc. The reason for this is that even when the read output image has no problem as an output result, the read output image is not exactly the same as the original image.

FIG. 2 is an explanatory drawing which shows an example of an original image and a scaled read output image.

Actually, the magnification ratio changes due to shrinkage of paper caused by thermal fixing or the like and the read output image is often not exactly the same as the original image. In the example shown in FIG. 2, L denotes the length from the upper end of the road sign 201 to the lower end of the road sign 202 in the original image 200 and L' denotes the length from the upper end of the road sign 201 to the lower end of the road sign 202 in the read output image 210. As a result of shrinkage of the paper S, the read output image 210 is smaller than the original image 200 (L'<L), but it has neither stain nor line (the output has no problem). However, since the read output image 210 has an area which is different from the original image 200 (area enclosed by the chain line), it may be mistakenly determined as being stained.

For this reason, the read output image, the original image, and data for abnormal image detection (hereinafter called "reference data") are used in order to determine whether or not the output image is abnormal. The reference data is image data used in order to prevent false abnormal image detection and generally an edge image which contains data representing an edge position in an image is used as reference data.

FIG. 3 is an explanatory drawing which shows an example of an original image and an edge image (reference data).

In comparison between images, the possibility of false detection caused by a difference in magnification ratio or a minor misalignment can be reduced by setting a slightly high threshold for an image edge position to determine abnormality. For example, when comparison is made between the original image 200 and the read output image 210, if the threshold for an edge position 232 in an extracted area 231 including the lower end of the road sign 202 in the edge image 230 is set to a slightly high value, misalignment between the lower end of the road sign 202 in the original image 200 and the lower end of the road sign 202 in the read output image 210 is not mistakenly detected as abnormal.

As shown in FIG. 3, the edge image 230 is created by the image forming apparatus receiving the original image 200 and checking each target pixel in the original image 200 and pixels around the target pixel. For this reason, if the original image 200 contains many edges, the hardware resources of the image forming apparatus (CPU, etc.) would be considerably consumed to generate reference data, resulting in long processing time.

FIG. 4 is a flowchart which shows the sequence from receipt of a job to image abnormality inspection in an ordinary image forming apparatus to image abnormality inspection.

When the image forming apparatus receives a job (original image) (S1), the apparatus determines whether or not the job is an abnormal image detection job which involves image abnormality inspection after job output (S2) and if the job is an abnormal image detection job (YES at S2), reference data is generated (S3). Then, the image forming apparatus performs output of the job (S4), and an image abnormality inspection is conducted on the output image formed on paper (S5), and processing after abnormal image detection is carried out as necessary. For example, if an abnormal image is detected, notice of image abnormality is given to the user or output of the job is stopped. On the other hand, if the received job is not an abnormal image detection job (NO at S2), the image forming apparatus performs output of the job (S4) and ends the processing sequence without conducting an image abnormality inspection at Step S5.

If image abnormality inspection is conducted using reference data, it is desirable that the image forming apparatus can generate reference data efficiently because image abnormality inspection cannot be started before generation of reference data is completed.

Patent Literature 1 (JP-A-2017-90444) discloses a technique as an image inspection method using such an edge image, in which an edge is extracted from an original image and in comparison between the read output image and the original image, a decision is made as to whether or not the image is a spoilage (abnormal image), according to the amount of change in the density of the vicinity of the edge. If the density difference in the edge is equal to or more than the threshold, the image is determined as an abnormal image.

CITATION LIST

Patent Literature

Patent Literature 1: JP-A-2017-90444

SUMMARY

As described above, the reference data to be used for image abnormality inspection is generated on the basis of the original image by the image forming apparatus which has received the original image. Ideally the reference data should be generated before an image reader finishes reading the paper. However, when generation of reference data is started after paper feeding, if generation of reference data is delayed, an inspection could not be started and printing of an image which might be abnormal would be performed because the operation proceeds sequentially from paper feeding through printing through paper delivery to reading.

For this reason, it is preferable that reference data should be generated before printing. Printing should be started after reference data for at least a given number of initial pages of the job is generated. The generation of reference data consumes the hardware resources (for example, CPU, memory, etc.) since the reference data is generated while image data is being checked. For example, while the job is not under execution, 90 percent of the resources can be used to generate reference data, but while the job is under execution, priority is given to the printing process and only 30 percent of the resources can be used to generate reference data. Thus, while the job is under execution, the speed of generation of reference data is low.

A production printing machine (PP machine) which produces a large volume of printed matter uses a system which distributes a job to make a plurality of copies of printed matter (distributed printing system, parallel tandem system). In the case of distributed printing in which printing is performed by a plurality of image forming apparatuses, an image forming apparatus (main machine) receives an original image processed by a RIP (Raster Image Processor) from a controller and transfers the original image to another image forming apparatus (sub machine) to perform distributed printing. When the image forming apparatuses are structured to conduct an image abnormality inspection, if the image forming apparatuses which have received the original image each generate reference data, it would take time for all the image forming apparatuses to generate reference data. Particularly in an image forming apparatus with a low-performance CPU (hardware resources), it would take a considerable time to finish the inspection.

The present invention has been made in view of the above circumstances and has an object to efficiently generate the reference data to be used for inspection in each image forming apparatus when distributed printing is performed by a plurality of image forming apparatuses which, after output of an image on paper, inspect the image.

To achieve the abovementioned object, according to an aspect of the present invention, in an image forming system reflecting one aspect of the present invention, distributed processing of a job is performed by a plurality of image forming apparatuses and each image forming apparatus inspects an output image formed on paper by the distributed processing. In the image forming system, each of the image forming apparatuses includes: an image forming section for forming an output image on paper according to original image data of the job; a reader for reading the output image formed on the paper and generating read image data; and an inspection section for inspecting the output image using the original image data, the read image data, and data for abnormal image detection as a reference for detection of an abnormal image. In the image forming system, one or more of the image forming apparatuses generate the data for abnormal image detection which is required to inspect the output image in the image forming apparatuses to perform the distributed processing.

BRIEF DESCRIPTION OF THE DRAWINGS

The advantages and features provided by one or more embodiments of the invention will become more fully understood from the detailed description given herein below and the appended drawings which are given by way of illustration only, and thus are not intended as a definition of the limits of the present invention:

FIG. 3 is an explanatory drawing which shows an example of an original image and an edge image (reference data);

FIG. 6 is an explanatory drawing which shows an example of a TANDEM SETUP screen;

FIG. 7 is an explanatory drawing which shows an example of an OUTPUT SETUP screen;

FIG. 13 is an explanatory drawing which shows an example of an apparatus information table in which information on each image forming apparatus according to the second embodiment of the present invention is registered;

FIG. 17 is an explanatory drawing which shows an example of reference data according to a fifth embodiment of the present invention.

DETAILED DESCRIPTION OF EMBODIMENTS

Figure 1:
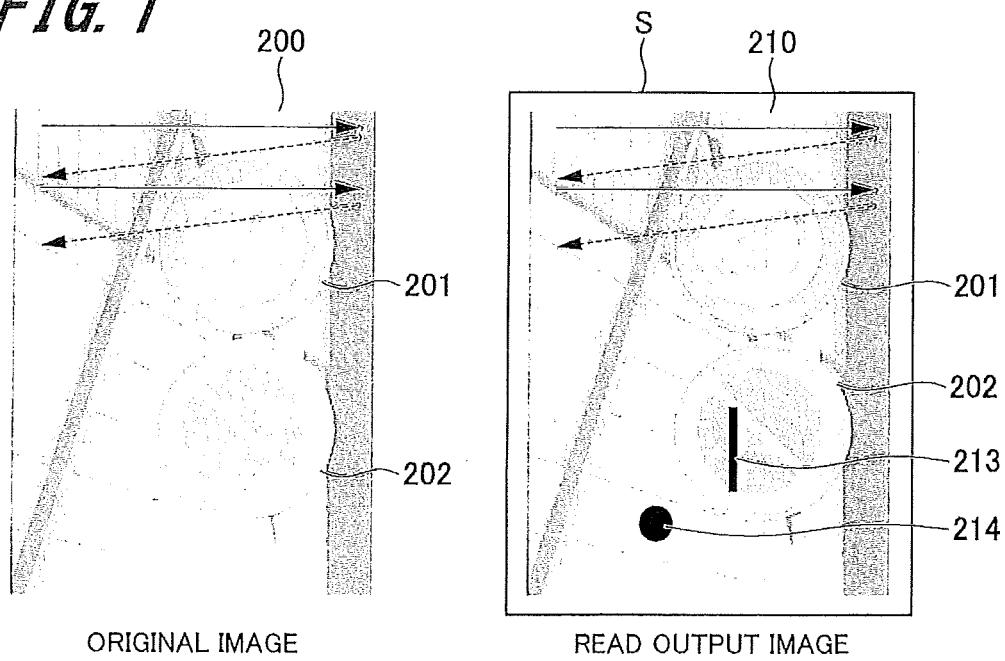
FIG. 1 is an explanatory drawing which shows an example of an original image and a read output image.
Figure 2:
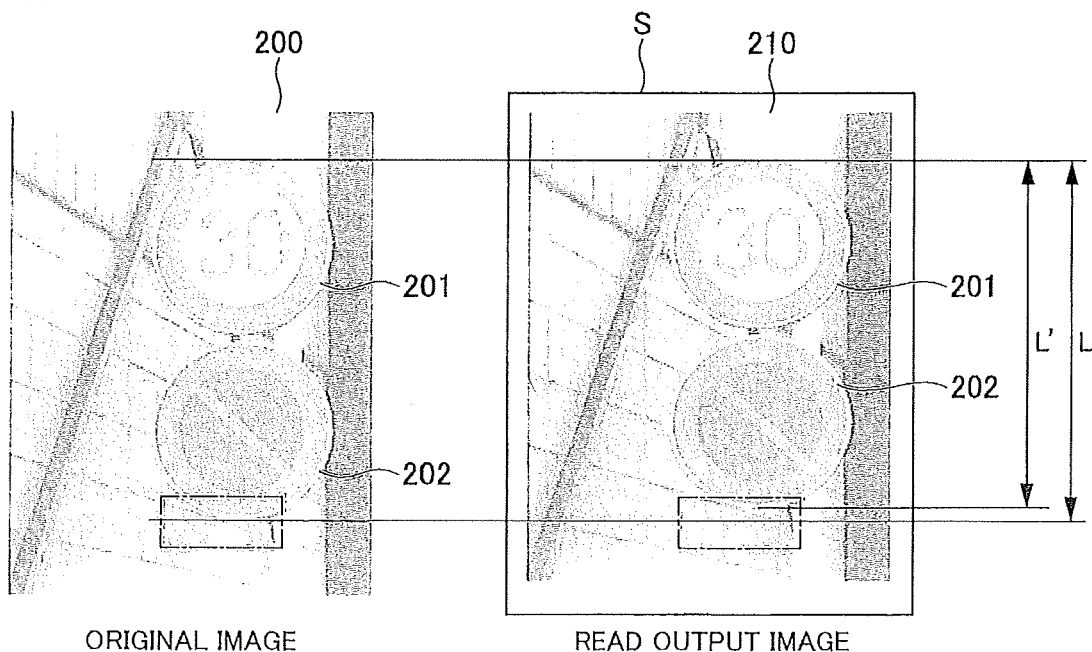
FIG. 2 is an explanatory drawing which shows an example of an original image and a scaled read output image.

Hereinafter, one or more embodiments of the present invention will be described with reference to the drawings. However, the scope of the invention is not limited to the disclosed embodiments. In the drawings, the elements with the substantially same functions or structures are designated by the same reference signs and description thereof is not repeated.

<1. First Embodiment>
[General Configuration of the Image Forming System]

Figure 5:
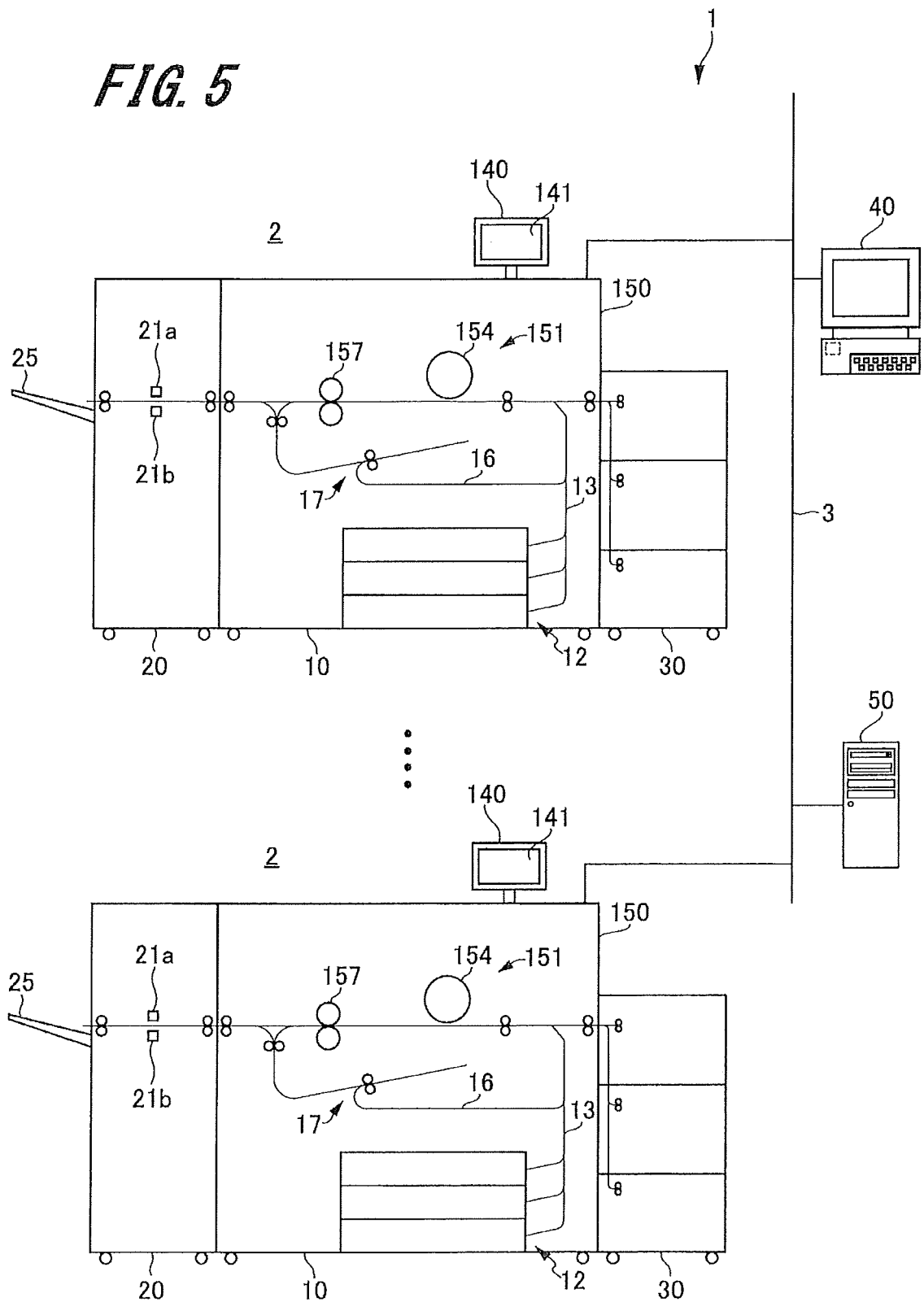
FIG. 5 is a block diagram which shows an example of the general configuration of an image forming system according to a first embodiment of the present invention.

FIG. 5 is a block diagram which shows the general configuration of the image forming system according to the first embodiment of the present invention.

The image forming system 1 includes a plurality of image forming apparatuses 2 which perform processing to form an image according to a received job. The image processing apparatuses 2 are connected to an external device 40 and a server 50 through a network such as LAN 3 so that the image Ruining apparatuses 2, external device 40, and server 50 can communicate with each other.

Each image forming apparatus 2 includes: an image forming apparatus main unit 10 to form an image on paper; a reading unit 20 to read the output image formed on the paper; and a large-capacity paper feed unit 30 to supply a large volume of paper. The large-capacity paper feed unit 30 is connected to the front side of the image forming apparatus main unit 10 and the reading unit 20 is connected to the back side of the image forming apparatus main unit 10. The large-capacity paper feed unit 30, image forming apparatus main unit 10, and reading unit 20 are connected in series. Paper can be conveyed from one image forming apparatus 2 to another and the image forming apparatuses 2 can communicate with each other. In this embodiment, the reading unit 20 performs inline processing in synchronization with the image forming apparatus main unit 10.

The general configuration of the image forming system 1 according to the present invention is not limited to the above configuration.

An LCD 141 of an operation unit 140 (see FIG. 5) is provided on the top of the image forming apparatus main unit 10. The LCD 141 is a touch panel which enables operation by an operator and display of information. The LCD 141 functions as both an operation unit and a display. Instead, a mouse and a tablet, etc. may constitute an operation unit and the operation unit may be separate from a display. The LCD 141 may be movable.

A plurality of paper feed trays 12 (three trays in FIG. 5) are located in the lower part of the image forming apparatus main unit 10. In the image forming apparatus main unit 10, a conveyance path 13 is provided to convey the paper fed from one of the paper feed trays 12 and a printer unit 150 is located midway in the conveyance path 13. The printer unit 150 includes an image forming section 151, paper feed trays 12, the conveyance path 13, a reverse conveyance path 16, a reversal section 17 and so on. A fixing unit 157 is located in the conveyance path 13 downstream of a photoreceptor drum 154.

On the downstream side of the fixing unit 157 in the paper conveying direction, the conveyance path 13 is extended and connected to a conveyance path in the reading unit 20. The conveyance path 13 bifurcates on the downstream side of the fixing unit 157 and joins the reverse conveyance path 16 which merges with the conveyance path 13 on the upstream side of the printer unit 150. The reverse conveyance path 16 includes the reversal section 17 which reverses the paper. The paper reversed by the reversal section 17 can be passed through the reverse conveyance path 16 and returned to the conveyance path 13 on the upstream side of the printer unit 150 or the paper reversed by switching the conveyance path can be sent back to the conveyance path 13 on the downstream side of the fixing unit 157 and conveyed to the reading unit 20.

How the image forming section 151 forms an image on paper will be described later. The paper on which an image has been formed by the printer unit 150 is conveyed to the fixing unit 157. The fixing unit 157 fixes the toner image transferred on the front surface of the paper as an output image by heating the conveyed paper. The paper subjected to the fixing process is conveyed through the conveyance path 13 to the reading unit 20 or passed through the reverse conveyance path 16 and reversed by the reversal section 17 and returned to the conveyance path 13 on the upstream side of the printer unit 150. An image is formed on the back surface of the reversed paper by the printer unit 150.

The reading unit 20 (an example of the reader) includes a first CCD 21a as an upper surface scanner located above the conveyance path for conveying an original and a second CCD 21b as a lower surface scanner located under the conveyance path. The first CDD 21a optically scans the upper surface of the paper conveyed from the image forming apparatus main unit 10 to read the information on the upper surface (output image) and generate read image data. The second CDD 21b optically scans the lower surface of the conveyed paper to read the information on the lower surface (output image) and generate read image data.

The configuration of the image forming apparatus 2 according to this embodiment is not limited to the configuration shown in FIG. 1. For example, a post-processing unit which performs post-processing work such as stapling or punching may be provided behind the reading unit 20. Alternatively a structure to perform the function of the reading unit 20 may be built in the image forming apparatus main unit 10.

By presetting the image forming apparatuses 2 (image forming apparatus main units 10) so as to operate in tandem with each other, the image forming apparatuses 2 can operate in a collaborative manner to perform distributed printing (also called parallel tandem output).

[Tandem Setup Screen]

FIG. 6 is an explanatory drawing which shows an example of a TANDEM SETUP screen to make tandem setup on the image forming apparatus main unit 10 which deals with the parallel tandem output function. Tandem setup is a process to set the IP address of the partner apparatus to perform parallel tandem output. The user enters the IP address of the partner apparatus (image forming apparatus main unit 10) to perform distributed printing in a collaborative manner, in the IP address field 60a on the TANDEM SETUP screen 60 shown in FIG. 6 to make tandem setup. Specifically, the IP address of the partner apparatus is entered on each of the image forming apparatus main units 10 to perform distributed printing.

[Output Setup Screen]

FIG. 7 is an explanatory drawing which shows an example of an OUTPUT SETUP screen to set the output features. The OUTPUT SETUP screen 61 shown in FIG. 7 provides the features to make settings for 2-sided binding, output orientation/output order, and post-processing work. When the user selects the TANDEM button 61a displayed on the OUTPUT SETUP screen 61 using the operation unit 140, the output features to be used by a plurality of image forming apparatus main units 10 set up for tandem output (functions for distributed printing) can be selected. By turning on the parallel tandem job mode using the job output features on the OUTPUT SETUP screen 61, the job is defined as a parallel tandem output job. Alternatively, for parallel tandem output, image forming apparatus main units 10 connected to the LAN 3 may be specified from the server 50.

Figure 4:
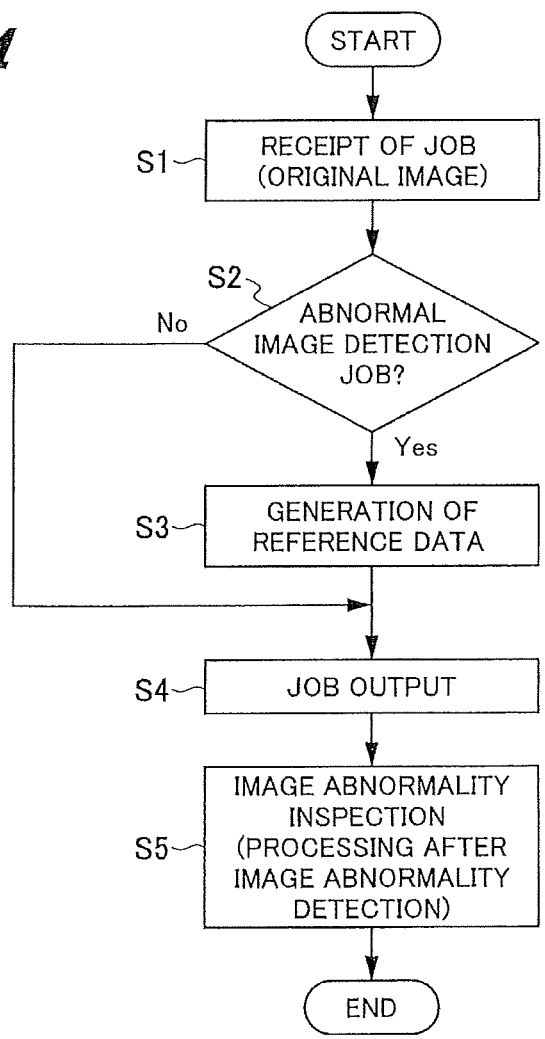
FIG. 4 is a flowchart which shows the sequence from receipt of a job to image abnormality inspection in an ordinary image forming apparatus.

When only one image forming apparatus 2 performs output of the job, it follows the process for job output and image abnormality inspection according to the flowchart shown in FIG. 4.

[Hardware Configuration of the Image Forming Apparatus]

Figure 8:
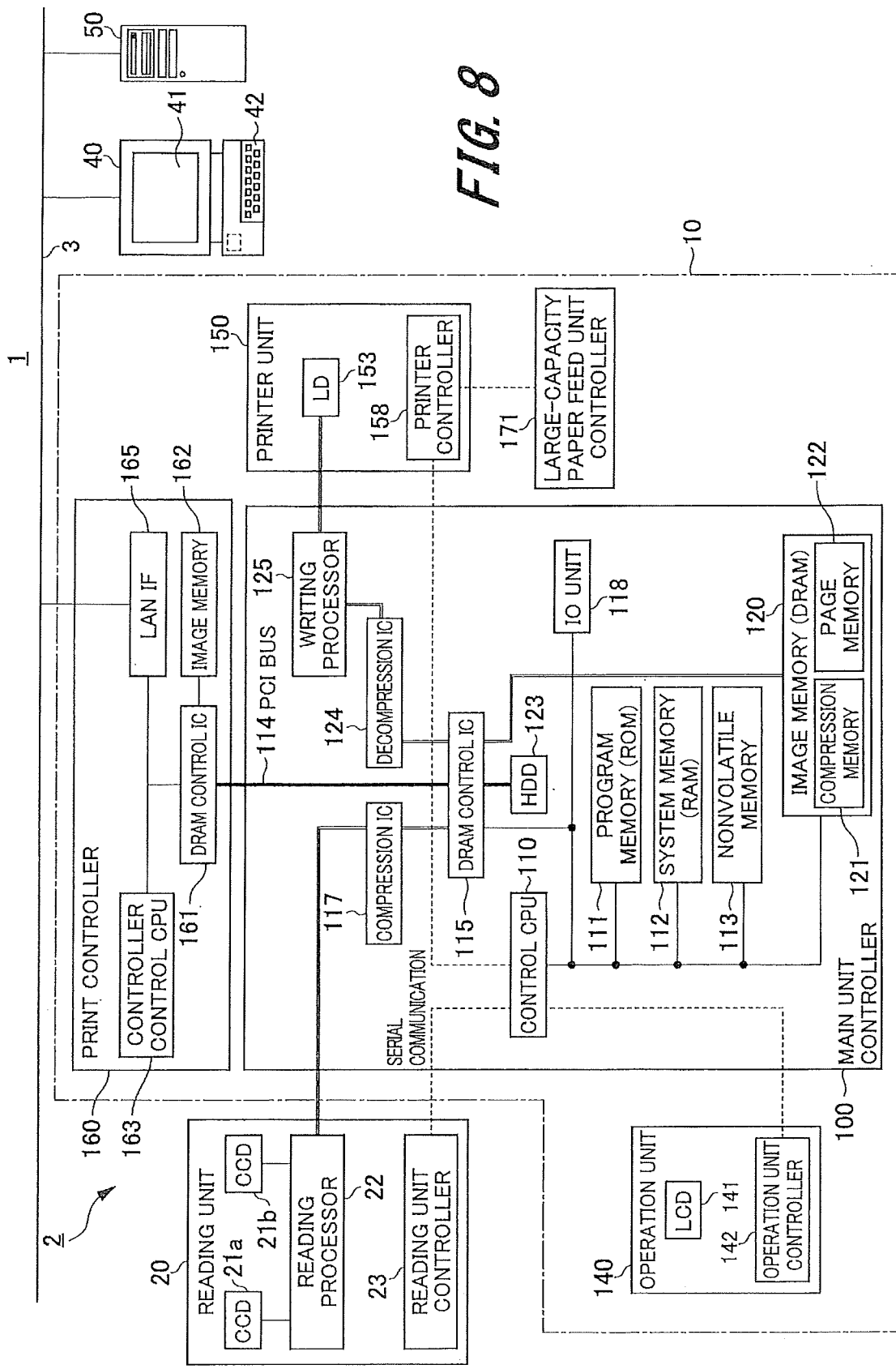
FIG. 8 is a block diagram which shows the hardware configuration of the image forming apparatus according to the first embodiment of the present invention.

FIG. 8 is a block diagram which shows an example of the hardware configuration of the image forming apparatus 2. As shown in FIG. 5, a plurality of image forming apparatuses 2 are connected to the LAN 3. FIG. 8 shows a single image forming apparatus 2 connected to the LAN 3.

The image forming apparatus main unit 10 of the image forming apparatus 2 includes a main unit controller 100, the reading unit 20, operation unit 140, and printer unit 150. The image forming apparatus main unit 10 further includes a print controller 160 which processes the image data received from the external device 40 such as a terminal PC through the LAN 3 or enables the image data obtained by the reading unit 20 to be transferred to the external device 40 through the LAN 3.

The main unit controller 100 has a PCI bus 114 connected to the print controller 160 and the PCI bus 114 is connected to a DRAM control IC 115. The DRAM control IC 115 is connected to an image memory 120. The image memory 120 is, for example, a DRAM (Dynamic Random Access Memory). The image memory 120 includes a compression memory 121 to store compressed image data and a page memory 122 to temporarily store uncompressed image data for printing before forming an image.

The PCI bus 114 is also connected to an HDD (Hard Disk Drive) 123 and the HDD 123 stores the image data acquired by the reading unit 20, the image data generated by the external device 40, etc. connected to the print controller 160, and the like.

The image data acquired by the print controller 160 or the image data stored in the HDD 123 is sent to the DRAM control IC 115 through the PCI bus 114 as printing operation proceeds.

The main unit controller 100 has a control CPU 110. The control CPU 110 is connected to the DRAM control IC 115.

Furthermore, the control CPU 110 is connected to a program memory 111, a system memory 112 (an example of the storage), and a nonvolatile memory 113. The program memory 111 is a ROM (Read Only Memory) which stores a program, etc. to operate the control CPU 110. The system memory 112 is a RAM (Random Access Memory) and used as a work area or the like. The nonvolatile memory 113 is a flash memory or the like. The nonvolatile memory 113 stores information on initial printing setup of the image forming apparatus main unit 10, mechanical setup information such as process control parameters, initial data for output setup, post-processing settings, and the like in a readable manner.

The control CPU 110 can read nonvolatile data from the nonvolatile memory 113 and can write desired data in the nonvolatile memory 113.

The control CPU 110 operates according to the program stored in the program memory 111 and controls operation of various components of the image forming apparatus main unit 10 according to the mechanical setup information, printing setup information, output setup information and the like which are read from the nonvolatile memory 113.

The control CPU 110 constitutes a control section together with the program memory 111, system memory 112, nonvolatile memory 113 and the like and can control the execution or stop of the job or the like.

The control CPU 110 enables output setup for a job and issuance of operation instructions through the operation unit 140.

The control CPU 110 provides a means to analyze the job, a means to determine the apparatus to generate reference data, a means to generate reference data, a means to execute the job, and a means to conduct an image abnormality inspection.

The operation unit 140 includes the LCD 141 and an operation unit controller 142 for controlling the entire operation unit, and the operation unit controller 142 is connected to the control CPU 110 in a serially communicable manner.

In the operation unit 140, under the control by the control CPU 110, the LCD 141 enables the operator to set output conditions, enter mechanical parameters including operation control conditions, enter paper attributes (size, type of paper, etc.) for each paper feed tray in the image forming apparatus main unit 10, and make settings to obtain prescribed post-processed printed matter by addition of offline processing work, and can display settings and desired information such as messages.

The operation unit 140 provides a means to display information to prompt the paper feed tray to be emptied and a means to enter information that the paper feed tray is empty.

The DRAM control IC 115 is connected to a compression IC 117 capable of compressing image data and a decompression IC 124 capable of decompressing image data. The DRAM control IC 115 controls compression of image data by the compression IC 117 and decompression of compressed image data by the decompression IC 124 and also controls input of image data from, or output of image data to, the image memory 120.

The writing processor 125 is connected to the image forming section 151 with an LD 153, etc. and generates the write data to be used for operation of the LD 153 on the basis of image data.

The printer unit 150 includes a printer controller 158 to control the entire operation of the printer unit 150 (paper feed, image formation, etc.) and the printer controller 158 is connected to the control CPU 110 in a serially communicable manner. The printer controller 158 operates according to a control command from the control CPU 110 to control the printer unit 150 for paper feed, image formation, and the like. The printer controller 158 may be part of the control section including the control CPU 110.

The printer controller 158 is connected, in a controllable manner, to a large-capacity paper feed unit controller 171 which controls the paper feed by the large-capacity paper feed unit 30. The printer controller 158 can give an instruction for paper feed to the large-capacity paper feed unit controller 171 according to a command from the control CPU 110 and also can acquire information on the condition of the large-capacity paper feed unit 30 from the large-capacity paper feed unit controller 171.

The PCI bus 114 connected to the DRAM control IC 115 is connected to the DRAM control IC 161 of the print controller 160. When the image forming apparatus main unit 10 is used as a network printer or network scanner, the print controller 160 enables the image forming apparatus main unit 10 to receive image data, etc. from the external device 40, etc. connected to the LAN 3 or send the image data acquired by the reading unit 20 to the external device 40 such as a terminal PC connected to the LAN 3.

In the print controller 160, the DRAM control IC 161 is connected to an image memory 162 which is a DRAM or the like. In the print controller 160, the DRAM control IC 161 and a controller control CPU 163 for controlling the entire print controller 160 and a LAN interface 165 are connected to a common bus. The LAN interface 165 is connected to the LAN 3.

The control CPU 110 is connected to an IO unit 118. The IO unit 118 functions as an interface which receives and transmits information between the control CPU 110 and various components of the image forming apparatus main unit 10.

The external device 40 includes a terminal display 41 to display and a terminal operation section 42 to receive user operation. The terminal display 41 can function as a display unit in the present invention and the terminal operation section 42 can function as an operation unit in the present invention.

The external device 40 may permit input for operation of the image forming apparatus main unit 10 on the terminal operation section 42 through VNC Client, etc. or may display information related to the image forming apparatus on the terminal display 41. For example, the terminal operation section 42 and terminal display 41 may constitute a touch panel, but they are not limited to a touch panel. Instead, the operation section and display may be separate from each other; for example, they may be a mouse and an LCD.

Next, basic operation of the image forming apparatus main unit 10 will be described.

First, the sequence of storing image data in the image forming apparatus main unit 10 is described below. The reading unit 20 optically reads an image from an original through a CCD 131 and generates image data. At this time, operation of the CCD 131 is controlled by a scanner controller 132 which receives a command from the control CPU 110. Reading of the original may be done while an automatic original supply unit 135 is automatically supplying the original or while the original is placed on the platen glass.

The control CPU 110 operates according to a program and issues a command to the reading unit 20 according to user operation through the operation unit 140 (read command or copy command). The image read by the first CCD 21a and the second CCD 21b is processed by a reading processor 22 and the processed image data is sent through the DRAM control IC 115 to the compression IC 117 where the data is compressed in a prescribed manner. The compressed data is stored in the image memory 120 through the DRAM control IC 115. If the data is to be stored in the HDD 123, the data once stored in the compression memory 121 is sent to the HDD 123 through the DRAM control IC 115.

Alternatively, the image data may be entered in the image forming apparatus main unit 10 through the LAN 3. The image data is, for example, print data obtained by decompression of a print file generated by an application program, etc. in the external device 40, etc. The method for generating image data is not limited.

The image data is received by the print controller 160 through the LAN 3 and LAN interface 165 and the print data obtained by the controller control CPU 163 is once stored in the image memory 162 by the DRAM control IC 161. The data stored in the image memory 162 is transferred to the DRAM control IC 115 through the PCI bus 114 and once stored in the page memory 122. The data stored in the page memory 122 is sent through the DRAM control IC 115 to the compression IC 117 where the data is compressed, then the data is stored in the compression memory 121 through the DRAM control IC 115. If the data is to be stored in the HDD 123, the data once stored in the compression memory 121 is sent to the HDD 123 through the DRAM control IC 115.

For storage of image data, output setup is made before or after storage of image data. The output setup can be made by calling up the OUTPUT SETUP screen at the operation unit 140 and the operator entering output parameters on the screen. As initial settings, default output parameters are preset and if the operator does not make entries, the default output parameters are set. The operator can make settings for post-processing work on the OUTPUT SETUP screen.

When the image forming apparatus main unit 10 performs output of an image, namely it is used as a copier or printer, the image data stored in the compression memory 121 is sent through the DRAM control IC 115 to the decompression IC 124 where the data is decompressed, then the decompressed data is sent to the writing processor 125 and written onto the photoreceptor drum 154 electrified by an electrifying section, by the LD 153. If the image data stored in the HDD 123 is used, the image data stored in the HDD 123 is once stored in the compression memory 121 through the DRAM control IC 115, the image data stored in the compression memory 121 is sent through the DRAM control IC 115 to the decompression IC 124 where the data is decompressed, then the decompressed data is sent to the writing processor 125 in the same way as above.

In the printer unit 150, the printer controller 158, which has received a command from the control CPU 110, controls various components. In the image forming section 151, the latent image written on the photoreceptor drum 154 is developed as a toner image by a developing device (not shown) and the toner image is transferred onto the paper supplied through the conveyance path 13 in the transfer section (not shown). In the fixing unit 157, the toner image transferred (formed) on the paper is fixed. After the toner image is transferred onto the paper, residual toner on the photoreceptor drum 154 is removed by a cleaner (not shown). In the present specification, forming an image on paper by the image forming section 151 under the control by the printer controller 158 as mentioned above may be called "printing".

So far the present embodiment has been described on the assumption that a monochrome image is formed; however, instead, the image forming apparatus may include photoreceptors for different colors (for example, cyan, magenta, yellow, black).

The paper on which an image has been formed is sent to the reading unit 20 through the conveyance path 13. The reading unit 20 reads the output image formed on the paper conveyed through the conveyance path 13. The reading unit 20 includes the first CCD 21a and second CCD 21b which perform optical reading, the reading processor 22, and a reading unit controller 23. The reading unit controller 23 is connected to the control CPU 110 in a serially communicable manner and controls the entire reading unit 20. The reading unit controller 23 may be connected not to the control CPU 110 but to the printer controller 158. The first CCD 21a and second CCD 21b are connected to the reading processor 22 which processes the image data read by the first CCD 21a and second CCD 21b, and the reading processor 22 is connected to the DRAM control IC 115 through the compression IC 117 in a controllable manner.

The reading processor 22 performs various processing tasks, such as analog signal processing, A/D (Analog to Digital) conversion, and shading, on the analog image signal received from the first CCD21a and second CCD 21b, generates digital image data, and sends the data to the compression IC 117. The output image on the paper sent to the reading unit 20 is read by the first CCD 21a and second CCD 21b and delivered to a delivery tray 25.

[Hardware Configuration of the Server]

Figure 9:
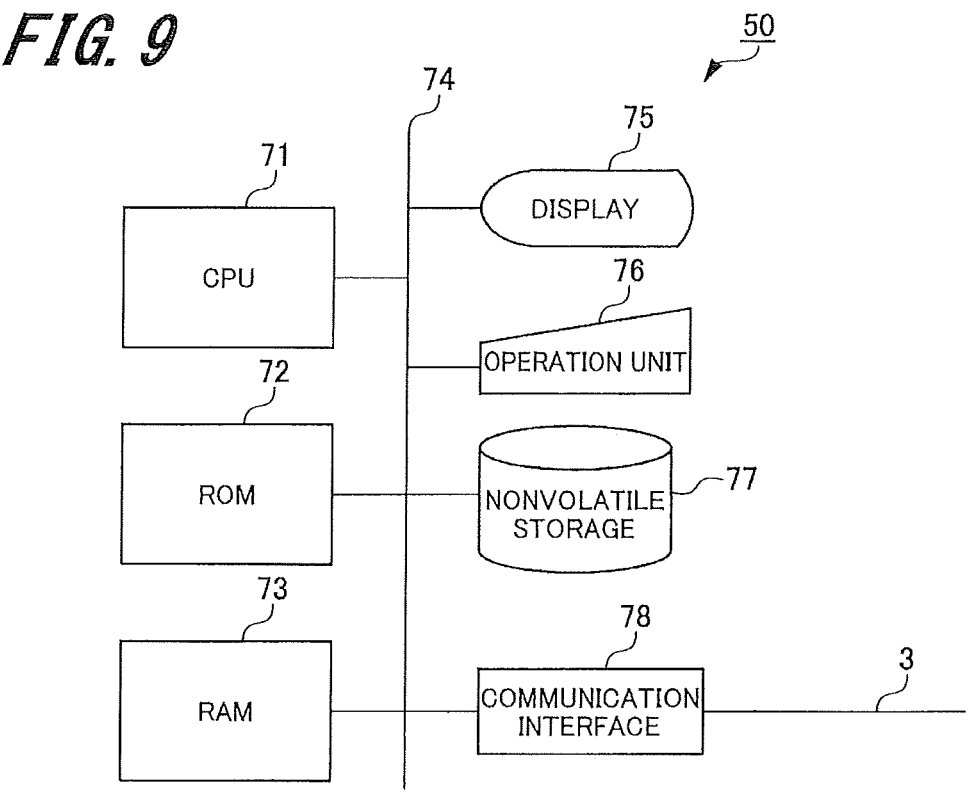
FIG. 9 is an explanatory drawing which shows an example of the hardware configuration of a server.

FIG. 9 is an explanatory drawing which shows an example of the hardware configuration of the server 50.

Next, the hardware configuration of the computer of the server 50 will be explained.

The server 50 includes a CPU (Central Processing Unit) 71, a ROM (Read Only Memory) 72, and a RAM (Random Access Memory) 73 which are connected to a bus 74. The server 50 further includes a display 75, an operation unit 76, a nonvolatile storage 77, and a communication interface 78.

The CPU 71, which is an example of the control section, reads a program code of the software to implement various functions according to the present embodiment, from the ROM 72 (an example of a recording medium) and executes the program. The functions of the server 50 are implemented by collaboration between the hardware and the software. Alternatively, the server 50 may include a processor such as an MPU (Micro-Processing Unit) instead of the CPU 71. Variables, parameters and the like which are generated during arithmetic operation are temporarily written in the RAM 73.

The display 75 is, for example, a liquid crystal display monitor which displays the result of processing by the server 50 and the like. The operation unit 76 uses, for example, a keyboard, mouse, or touch panel, etc. and enables the user to make a specific entry for operation or give an instruction. The display 75 and the operation unit 76 are omissible.

The nonvolatile storage 77 (an example of a recording medium) may be any of the following: HDD (Hard Disk Drive), SSD (Solid State Drive), flexible disk, optical disk, magneto-optical disk, CD-ROM, CD-R, magnetic tape, nonvolatile memory card and the like. The nonvolatile storage 77 may store not only an OS (Operating System) and various parameters but also a program for the server 50 to function.

The communication interface 78 is, for example, an NIC (Network Interface Card) and allows transmission and receipt of various kinds of data between apparatuses through the LAN 3.

[Functional Configuration of the Image Forming Apparatus]

Figure 10:
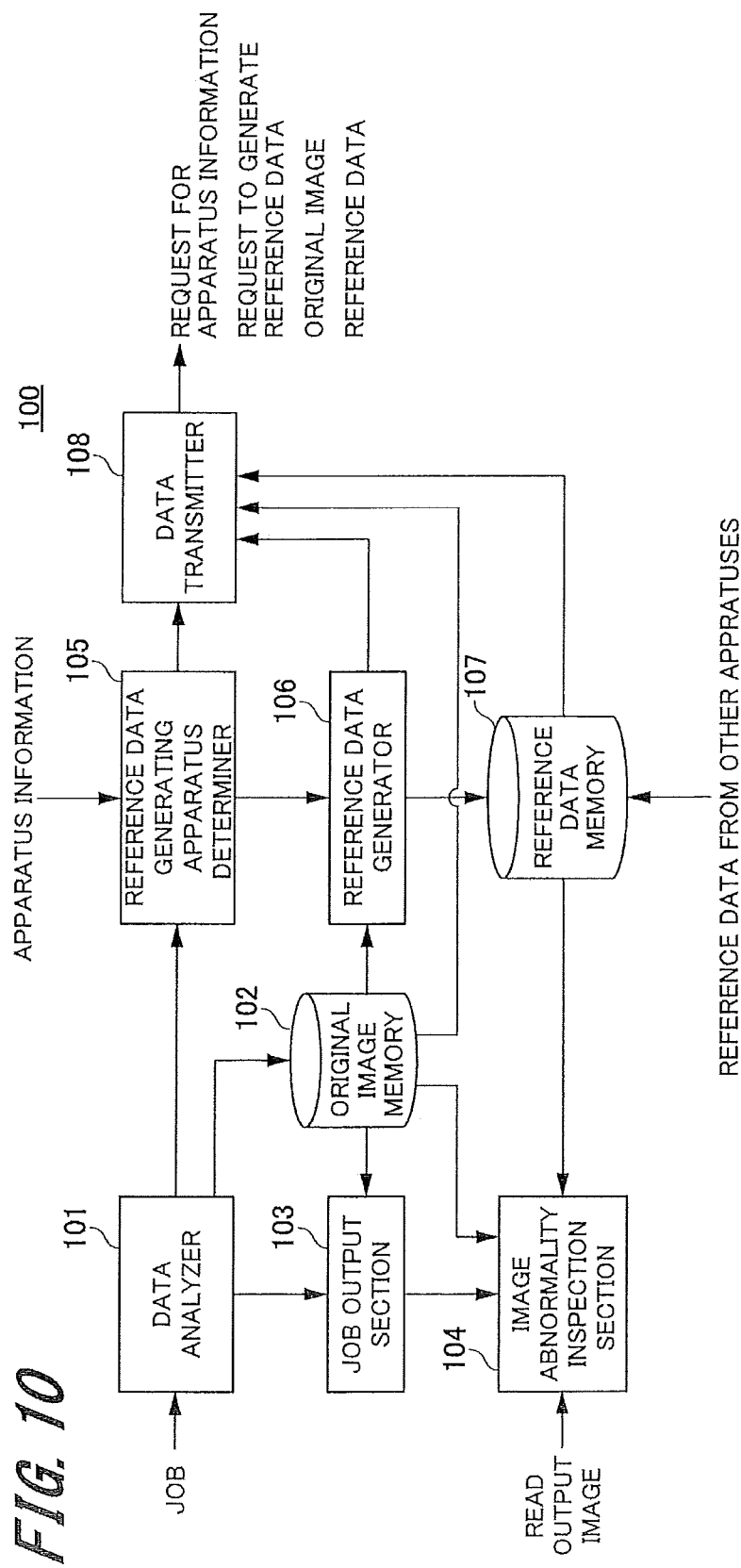
FIG. 10 is a block diagram which shows an example of the functional configuration of the main unit controller of the image forming apparatus main unit according to the first embodiment of the present invention.

FIG. 10 is a block diagram which shows an example of the functional configuration of the main unit controller 100 of the image forming apparatus main unit 10. When the control CPU 110 reads the program stored in the program memory 111 and executes it, the various components shown in FIG. 10 are operated.

The main unit controller 100 includes a data analyzer 101, an original image memory 102, a job output section 103, an image abnormality inspection section 104, a reference data generating apparatus determiner 105, a reference data generator 106, a reference data memory 107, and a data transmitter 108.

The data analyzer 101 analyzes the received data (for example, job) and sends the result of analysis to the job output section 103 and the reference data generating apparatus determiner 105. The data analyzer 101 stores the original image data of the received job in the original image memory 102.

The original image memory 102 stores the original image data sent from the data analyzer 101. Also, the original image memory 102 sends the original image data to the job output section 103, image abnormality inspection section 104, reference data generator 106, and data transmitter 108 as appropriate.

Upon receipt of the result of analysis by the data analyzer 101, the job output section 103 performs job output processing to form an output image on paper on the basis of the original image data stored in the original image memory 102.

The image abnormality inspection section 104 conducts an image abnormality inspection of the output image formed on the paper concurrently with the job output processing by the job output section 103. The image abnormality inspection section 104 conducts an image abnormality inspection using the read output image sent from the reading unit 20, the original image data, and reference data to be used to prevent false abnormal image detection. If the job is not a distributed printing job, no image abnormality inspection is conducted.

At least one of the image forming apparatuses 2 has a reference data generating apparatus determiner 105. The reference data generating apparatus determiner 105 acquires information on each image forming apparatus 2 as apparatus information from the own apparatus 2 and other image forming apparatuses 2 and determines the image forming apparatus 2 to generate reference data on the basis of the apparatus information.

The apparatus information includes the existence or non-existence of a reserved job and hardware resource information (CPU performance, availability of reading means, etc.). This apparatus information is the basis to determine the image forming apparatus to generate reference data. The reference data generating apparatus determiner 105 sends a request for apparatus information to each image forming apparatus 2 through the data transmitter 108 before acquiring apparatus information from each image forming apparatus 2, and receives apparatus information as a reply from each image forming apparatus 2. Hereinafter, the reference data generating apparatus determiner 105 is called the "generating apparatus determiner 105."

Once the generating apparatus determiner 105 determines the image forming apparatus 2 to generate reference data, it sends a request to generate reference data and the original image data to the determined image forming apparatus 2. As reference data is generated by the image forming apparatus 2 to which the request to generate reference data has been sent, the image forming apparatus 2 which has sent the request to generate reference data receives the reference data and stores it in a reference data memory 107. If the generating apparatus determiner 105 determines that the own apparatus should generate reference data, it instructs the reference data generator 106 to generate reference data.

The reference data generator 106 generates reference data (edge image in this example) on the basis of the specified original image data. Specifically, when the reference data generator 106 receives an instruction to generate reference data from the generating apparatus determiner 105, it generates reference data on the basis of the relevant original image data in the original image memory 102. If the reference data generator 106 receives a request to generate reference data from another image forming apparatus 2, it generates reference data on the basis of the original image data received together with the request. The generated reference data is stored in the reference data memory 107.

The reference data memory 107 stores the reference data received from the other image forming apparatus 2 and the reference data generated by the own apparatus. The original image memory 102 and reference data memory 107 correspond to the image memory 120 shown in FIG. 8.

The data transmitter 108 performs processing to send data to the external device. For example, the data transmitter 108 sends a request for apparatus information to another image forming apparatus 2 and sends a request to generate reference data, original image data, and reference data stored in the reference data memory 107.

[Sequence of Job Output Processing by the Image Forming System]

Figure 11:
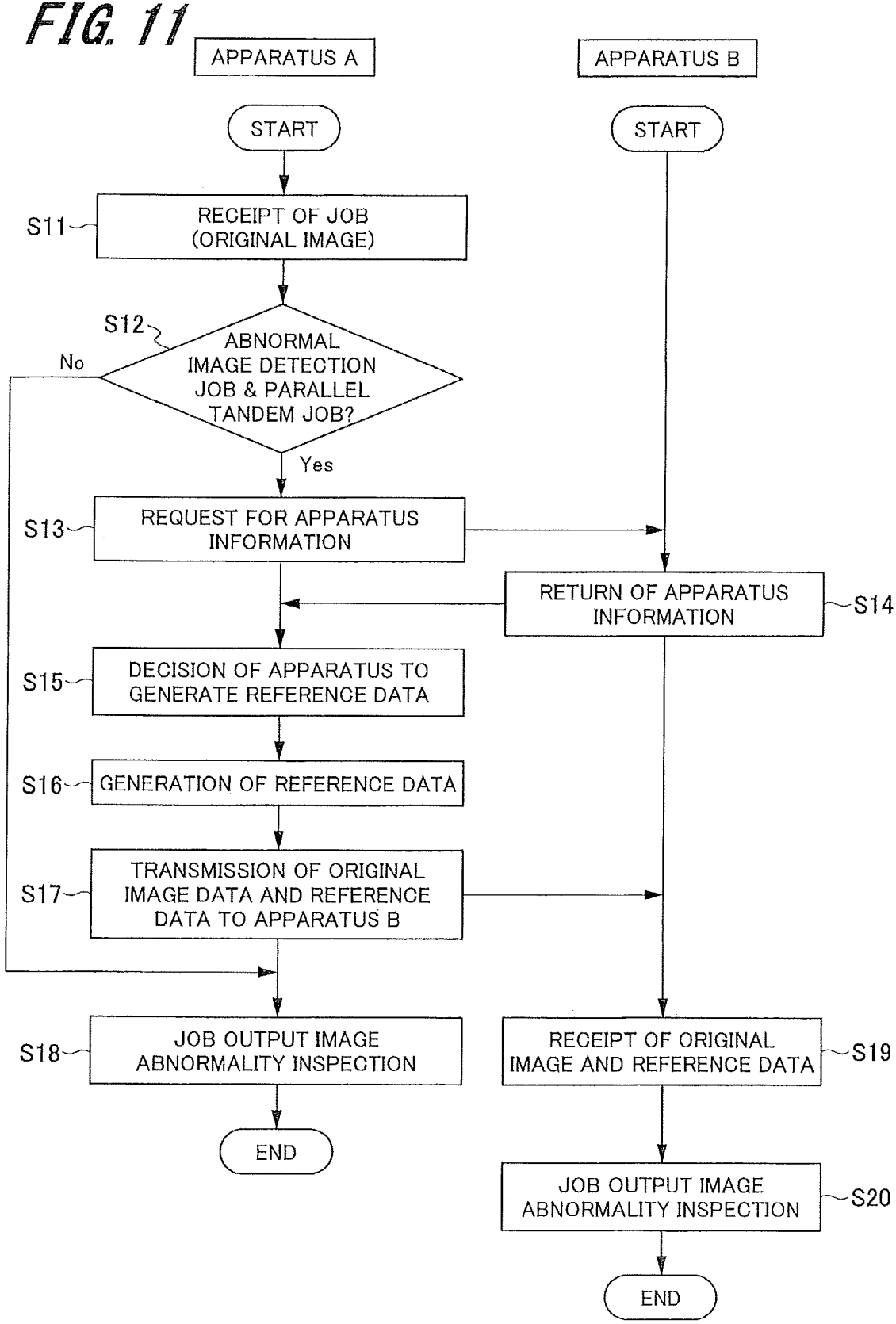
FIG. 11 is a flowchart which shows an example of the sequence of job output processing by the image forming system according to the first embodiment of the present invention.

FIG. 11 is a flowchart which shows an example of the sequence of job output processing by the image forming system 1. FIG. 11 shows an example in which two image forming apparatuses 2 (apparatus A, apparatus B) perform parallel tandem output (distributed printing) and the apparatus A and apparatus B are preset for tandem output on the TANDEM SETUP screen 60 shown in FIG. 6. In this example, it is assumed that the print controller 160 of the apparatus A (FIG. 8) receives a parallel tandem job.

First, when the apparatus A receives a job (original image) (S11), the data analyzer 101 determines whether or not the received job is an abnormal image detection job and a parallel tandem job (S12). If it is determined that the job is not an abnormal image detection job and a parallel tandem job (No at S12), the sequence goes to Step S18 and the apparatus A performs output of the job by itself.

On the other hand, if it is determined that the job is an abnormal image detection job and a parallel tandem job (Yes at S12), the generating apparatus determiner 105 requests the apparatus B as the partner apparatus for parallel tandem output to send back apparatus information (existence or nonexistence of a reserved job, hardware resource information) and waits for a reply (S13). The apparatus B, which has received the request from the apparatus A, returns the apparatus information on the apparatus B (reply) to the apparatus A (S14).

Then, the generating apparatus determiner 105 of the apparatus A, which has received the reply from the apparatus B, determines the apparatus to generate reference data on the basis of the apparatus information on the own apparatus (apparatus A) and the apparatus information acquired from the apparatus B (S15). Here, it is assumed that the apparatus A is not under output of a job and the apparatus information received from the apparatus B indicates that "the apparatus B is under output of a reserved job". In this case, the generating apparatus determiner 105 determines that if the apparatus A generates reference data and sends the reference data together with the original image data to the apparatus B, the parallel tandem job can be started without the need for the apparatus B to generate reference data, after the apparatus B ends the output of the job. Therefore, the generating apparatus determiner 105 instructs the reference data generator 106 of the own apparatus to start to generate reference data (S16).

Then, after the reference data generator 106 of the apparatus A generates reference data, the job output section 103 starts output of the job (S18) and at the same time, sends the parallel tandem job (original image data and reference data) to the apparatus B (S17). The apparatus B, which has received the parallel tandem job (S19), starts output of the job (S20) after ending the ongoing job (the above reserved job).

In the apparatus A, which has started output of the job, each time an output image is formed on paper, the image abnormality inspection section 104 conducts an image abnormality inspection using the original image, read output image, and reference data generated by the own apparatus (S18). In the apparatus B, which has started output of the job, each time an output image is formed on paper, the image abnormality inspection section 104 conducts an image abnormality inspection using the original image, read output image, and reference data received from the apparatus A (S20).

In the first embodiment configured as mentioned above, the apparatus to generate reference data is determined according to the conditions (apparatus information) of the apparatus A and apparatus B preset for tandem output. The apparatus A (main machine) which first receives a job (original image) generates reference data and sends it to the other apparatus (apparatus B), thereby making it unnecessary for the apparatus B to generate reference data. Thus, the hardware resources of the apparatus A and apparatus B are effectively used and the generated reference data is shared by the apparatus A and apparatus B, leading to reduction in the downtime required to generate reference data. In other words, according to the first embodiment, when distributed printing (parallel tandem output) is performed by a plurality of image forming apparatuses structured to inspect, after output of an image on paper, the image, the reference data to be used for inspection in each image forming apparatus can be efficiently generated.

<Second Embodiment>

Even when distributed printing is performed by three or more image forming apparatuses 2, it is desirable to determine the image forming apparatus 2 to generate reference data according to the conditions of the image forming apparatuses 2. The second embodiment assumes that four image forming apparatuses 2 are candidates to perform a parallel tandem job.

Figure 12:
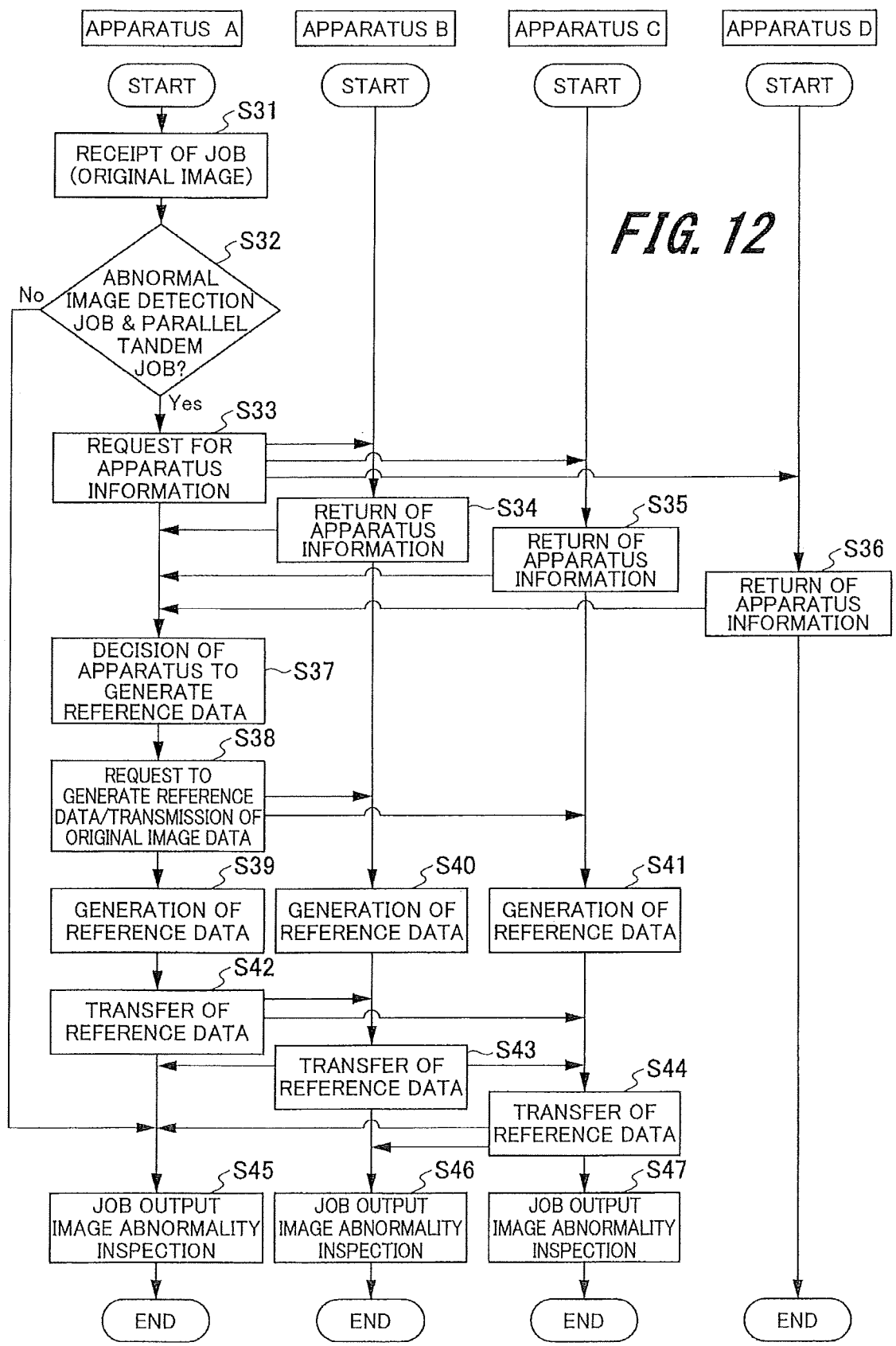
FIG. 12 is a flowchart which shows an example of the sequence of job output processing by the image forming system according to a second embodiment of the present invention.

FIG. 12 is a flowchart which shows an example of the sequence of job output processing by the image forming system 1 according to the second embodiment. It is assumed that the apparatus A to apparatus D are preset for tandem output on the TANDEM SETUP screen 60 shown in FIG. 6. In this example, it is assumed that the print controller 160 of the apparatus A (FIG. 8) receives a parallel tandem job.

First, when the apparatus A receives a job (original image) (S31), the data analyzer 101 determines whether or not the received job is an abnormal image detection job and a parallel tandem job (S32). If it is determined that the job is not an abnormal image detection job and a parallel tandem job (No at S32), the sequence goes to Step S45 and the apparatus A performs output of the job by itself.

On the other hand, if it is determined that the job is an abnormal image detection job and a parallel tandem job (Yes at S32), the generating apparatus determiner 105 requests the other apparatuses for parallel tandem output, or apparatuses B to D, to send back apparatus information (existence or nonexistence of a reserved job, hardware resource information) and waits for a reply (S33). The apparatuses B to D, which have received the request from the apparatus A, return apparatus information on the apparatuses B to D (reply) to the apparatus A, respectively (S34 to S36).

After receiving the apparatus information from all the apparatuses A to D, the generating apparatus determiner 105 of the apparatus A determines which apparatus should generate reference data (S37). FIG. 13 shows an example of an apparatus information table in which apparatus information is registered.

FIG. 13 is an explanatory drawing which shows an example of an apparatus information table in which the apparatus information on each apparatus is registered. The apparatus information table T contains an APPARATUS field, a RESERVED JOB field, a CPU PERFORMANCE field, a READING UNIT field, and a PRINT SPEED field.

APPARATUS indicates identification information such as the name or identification number of each apparatus. RESERVED JOB indicates whether or not the image forming apparatus has a reserved job. CPU PERFORMANCE indicates the processing capability of the CPU; in the example shown in FIG. 13, the capability is expressed by three levels, HIGH, MIDDLE, and LOW; instead the level may be expressed by operating frequency. READING UNIT indicates whether or not a reading unit 20 is provided at the back side of the image forming apparatus. PRINT SPEED indicates the processing speed of the image forming apparatus (PPM, or pages per minute).

According to the apparatus information table T, the apparatus D is not connected to the reading unit and thus unable to conduct an image abnormality inspection, so it is excluded from being a candidate for the parallel tandem job. Then the apparatus to generate reference data should be selected according to existence or nonexistence of a reserved job and CPU performance. From the viewpoint of CPU performance, the apparatus B (CPU performance "HIGH") or the apparatus C (CPU performance "HIGH") should be selected and from the viewpoint of existence or nonexistence of a reserved job, the apparatus A (reserved job "NO") or the apparatus C (reserved job "NO") should be selected. Thus, the generating apparatus determiner 105 of the apparatus A determines the descending order of priority, apparatus C, apparatus A, and apparatus B, and then determines the number of reference data pages (assignment) to be generated by each apparatus. Among the apparatuses which have no reserved job, higher priority is given to an apparatus with higher CPU performance.

For example, when the volume of all the reference data that is required to inspect an output image in several apparatuses supposed to perform parallel tandem output is expressed as 100%, the generating apparatus determiner 105 assigns a share (percentage) to each apparatus as follows: 25% to the apparatus A, 5% to the apparatus B, and 70% to the apparatus C. Consequently, parallel tandem output is performed by three image forming apparatuses 2 (apparatuses A to C) among the four. The percentages given here are just an example and the assignment percentages are not limited to this example.

After determining the assignment of reference data to be generated, the generating apparatus determiner 105 of the apparatus A sends the original image data and a request to generate reference data (including page information indicating which pages of the job to generate) to the apparatuses B and C (S38). Further, the generating apparatus determiner 105 of the apparatus A sends the apparatuses B and C a request to send the generated reference data to the other apparatuses to perform the parallel tandem job and a request to perform the job after receiving reference data from the other apparatuses and becoming ready for output (reservation of the job).

The reference data generator 106 of the apparatus A selects the reference data to be generated by the apparatus A on the basis of the reference data generation page information and generates the reference data (S39). Then, the data transmitter 108 of the apparatus A transfers the generated reference data to the apparatuses B and C (S42). The job output section 103 of the apparatus A receives reference data from the apparatuses B and C and makes a reservation for the next job. If output of the ongoing job is ended, the job output section 103 starts output of the job (S45).

After receiving the request to generate reference data and the original image data, the apparatus B selects the reference data to be generated by the apparatus B on the basis of the reference data generation page information and generates the reference data (S40). Then, the apparatus B transfers the generated reference data to the apparatuses A and C (S43). Further, the apparatus B receives reference data from the apparatuses A and C and makes a reservation for the next job. If output of the ongoing job is ended, the job output section 103 starts output of the job (S46).

Similarly, the apparatus C generates reference data (S41) and transfers the generated reference data to the apparatuses A and B (S44). Similarly, the apparatus C receives reference data from the apparatuses A and B and starts output of the job (S47).

In the apparatus A, which has started output of the job, each time an output image is formed on paper, the image abnormality inspection section 104 conducts an image abnormality inspection using the original image, read output image, and reference data generated by the own apparatus and the apparatuses B and C (S45).

Similarly, each time an output image is formed on paper, the apparatus B, which has started output of the job, conducts an image abnormality inspection using the original image, read output image, and reference data generated by the own apparatus and the apparatuses A and C (S46). Furthermore, similarly, each time an output image is formed on paper, the apparatus C, which has started output of the job, conducts an image abnormality inspection using the original image, read output image, and reference data generated by the own apparatus and the apparatuses A and B (S47).

In the second embodiment configured as mentioned above, as in the first embodiment, even when three or more image forming apparatuses are used to perform a parallel tandem job, the hardware resources of the image forming apparatuses can be effectively used to generate reference data efficiently. Consequently, the downtime required to generate reference data can be reduced.

If the print speed differs among the apparatuses which perform parallel tandem output, the number of print copies may be varied from one apparatus to another. In this case, it is desirable to assign a larger number of print copies to a higher speed apparatus, taking the number of original images, the number of apparatus units, CPU performance, and print speed into consideration.

For example, when the apparatus A (CPU performance "MIDDLE") and apparatus C (CPU performance "HIGH") perform a parallel tandem job, in consideration of the CPU processing speed and the order of original images, 30% of the pages from the last page in the original image data is assigned to the apparatus A and 70% of the pages from the first page in the original image data is assigned to the apparatus C to generation reference data. At the same time, in terms of the number of print copies, 30% of the pages from the last page in the original image data is assigned to the apparatus A and 70% of the pages from the first page in the original image data is assigned to the apparatus C. Consequently, both the apparatuses end operation at the same time and can proceed to the next step for output without the need for one apparatus to wait for the end of operation of the other apparatus. The percentages given here are just an example and the assignment percentages are not limited to this example.

In addition, if the parallel tandem job is a job which distributes different pages to several apparatuses (for example, the job is output of one copy), reference data cannot be shared by the several apparatuses. Therefore, basically, a request to send, after generation of reference data, the reference data to the other apparatuses to perform the parallel tandem job is not issued.

Even in this case, the hardware resources can be shared, though the reference data cannot be shared. For example, if a parallel tandem job is to print only one copy that has 10,000 pages, it is assumed that the printing job is evenly distributed by assigning 5,000 pages to the apparatus A and 5,000 pages to the apparatus C. Since the relation between the apparatus A and apparatus C in CPU performance is A<C, the apparatus C may undertake some of the pages of reference data which the apparatus A should generate. For example, the apparatus C generates reference data for 7,000 pages (5000+2000) and among these pages, reference data for 2,000 pages to be used only by the apparatus A is sent from the apparatus C to the apparatus A. After the apparatus A generates reference data for 3,000 pages, it starts output of the 3,000 pages in the job. The apparatus A receives the reference data for the remaining 2,000 pages from the apparatus C during output of the 3,000 pages in the job and can successively output the remaining pages from Page 3001 to Page 5000. Since the print speed of the apparatus C is higher than that of the apparatus A, finally both the apparatuses can end output of 5,000 pages at the same time.

<3. Third Embodiment>

In the third embodiment, a plurality of image forming apparatuses 2 perform parallel tandem processing according to instructions from the server 50 connected to the image forming apparatuses 2 through the LAN 3 (FIGS. 5 and 9) in a communicable manner.

Figure 14:
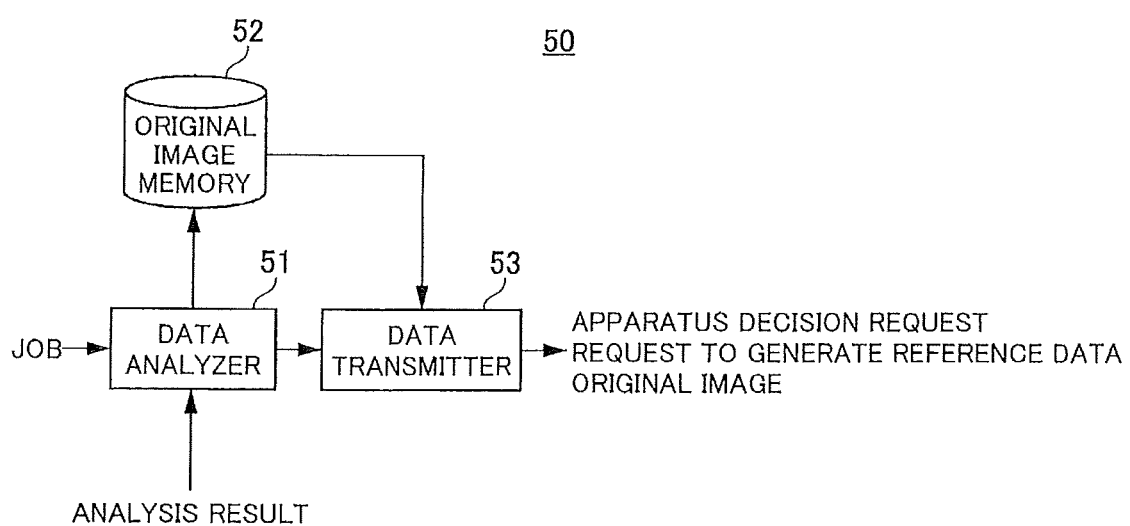
FIG. 14 is a block diagram which shows an example of the functional configuration of a server according to a third embodiment of the present invention.

FIG. 14 is a block diagram which shows an example of the functional configuration of the server 50 according to the third embodiment. The server 50 includes a data analyzer 51, an original image memory 52, and a data transmitter 53.

The data analyzer 51 analyzes the received data (for example, job) and sends the result of analysis to the data transmitter 53. The data analyzer 51 stores the original image (image data) of the received job in the original image memory 52. If the job is a parallel tandem job which involves abnormal image detection, the data analyzer 51 sends a request to determine the image forming apparatus to generate reference data (hereinafter called "apparatus decision request") to an image forming apparatus 2 among the image forming apparatuses 2 which has a generating apparatus determiner 105. Further, as the data analyzer 51 receives the result of decision as a reply from the image forming apparatus 2 to which the apparatus decision request has been sent, the data analyzer 51 sends a request to generate reference data and the original image data to the image forming apparatus 2 determined to generate reference data.

The data transmitter 53 performs a process to send data to the external device according to an instruction from the data analyzer 51. Specifically, the data transmitter 53 sends an apparatus decision request, a request to generate reference data, and the original image data to the image forming apparatus 2.

Figure 15:
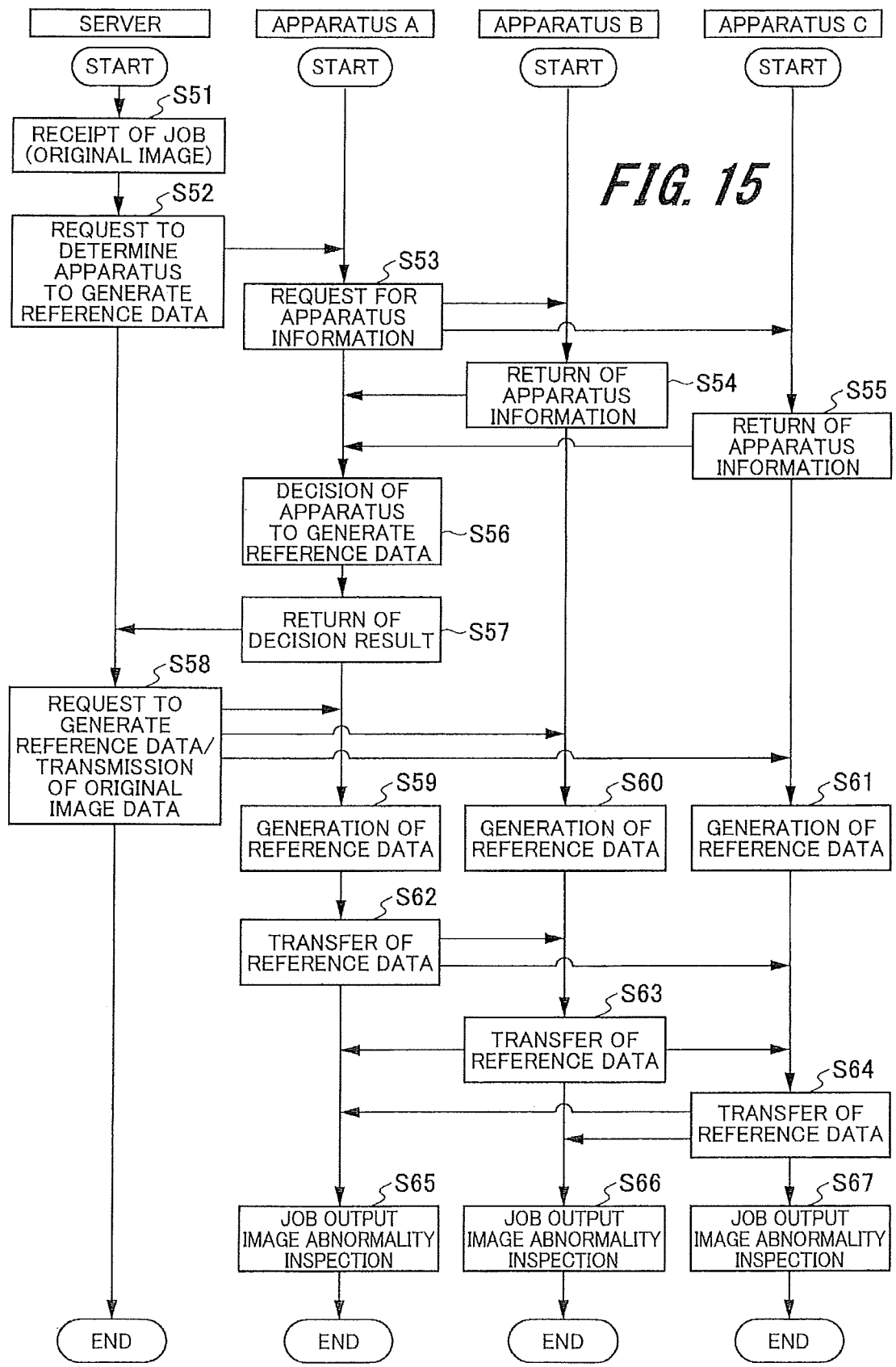
FIG. 15 is a flowchart which shows an example of the sequence of job output processing by an image forming system according to the third embodiment of the present invention.

FIG. 15 is a flowchart which shows an example of the sequence of job output processing by the image forming system according to the third embodiment. In the example shown in FIG. 15, it is assumed that parallel tandem output (distributed printing) is to be performed by three image forming apparatuses 2 (apparatus A to apparatus C) and the apparatus A to apparatus C are preset for tandem output on the TANDEM SETUP screen 60 shown in FIG. 6. In this example, the server 50 sends an apparatus decision request to the print controller 160 (FIG. 8) of the apparatus A.

First, when the server 50 receives a job (original image) (S51), the data analyzer 51 determines whether or not the received job is an abnormal image detection job and a parallel tandem job. If the data analyzer 51 determines that the job is not an abnormal image detection job and a parallel tandem job, the data analyzer 51 transfers the job, for example to the apparatus A.

If the data analyzer 51 determines that the received job is an abnormal image detection job and a parallel tandem job, it sends a request to determine the apparatus to generate reference data (apparatus decision request) to the apparatus A which has a generating apparatus determiner 105 (S52). The data analyzer 51 also sends information on the number of copies and the number of pages for the parallel tandem job, and information on the image forming apparatuses to perform the parallel tandem job, to the apparatus A.

As the apparatus A receives the apparatus decision request from the server 50, it requests the apparatuses B and C as the partners for parallel tandem output to send back apparatus information and waits for a reply (S53). The apparatuses B and C, which have received the request for apparatus information from the apparatus A, return apparatus information on the apparatuses B and C to the apparatus A, respectively (S54, S55). After receiving the apparatus information from the apparatuses B and C, the apparatus A determines which apparatus should generate which pages of reference data (S56) and returns the result of decision to the server 50 (S57).

The data analyzer 51 of the server 50 sends a request to generate reference data and the original image data to the apparatuses A to C (S58). At this time, the data analyzer 51 also sends information on the pages to be generated by the receiving apparatus and information on apparatuses to which reference data should be sent. When sending the original image data, the server 50 may first send information on the pages for which reference data should be generated, to the apparatuses A to C.

After receiving the request to generate reference data and the original image data, each of the apparatuses A to C selects the reference data to be generated by each apparatus according to the reference data generation page information and generates the reference data (S59 to S61). Then, each apparatus transfers the generated reference data to the other apparatuses (S62 to S64).

Then, each of the apparatuses A to C receives the reference data generated by the other apparatuses and when it becomes ready for output, it starts job output processing (S65 to S67). In each of the apparatuses A to C which have started output of the job, each time an output image is formed on paper, the image abnormality inspection section 104 conducts an image abnormality inspection using the original image, read output image, and reference data generated by the own apparatus and the other apparatuses (S65 to S67).

In the third embodiment configured as mentioned above, as in the first and second embodiments, even in a system in which the server 50 controls processing for parallel tandem output, the hardware resources of the image forming apparatuses can be effectively used to generate reference data efficiently. Consequently, the downtime required to generate reference data can be reduced.

<4. Fourth Embodiment>

Even when the information as the base for generation of reference data is a read output image obtained by the reading unit 20 reading an output image, reference data can be efficiently generated as in the first to third embodiments.

Figure 16:
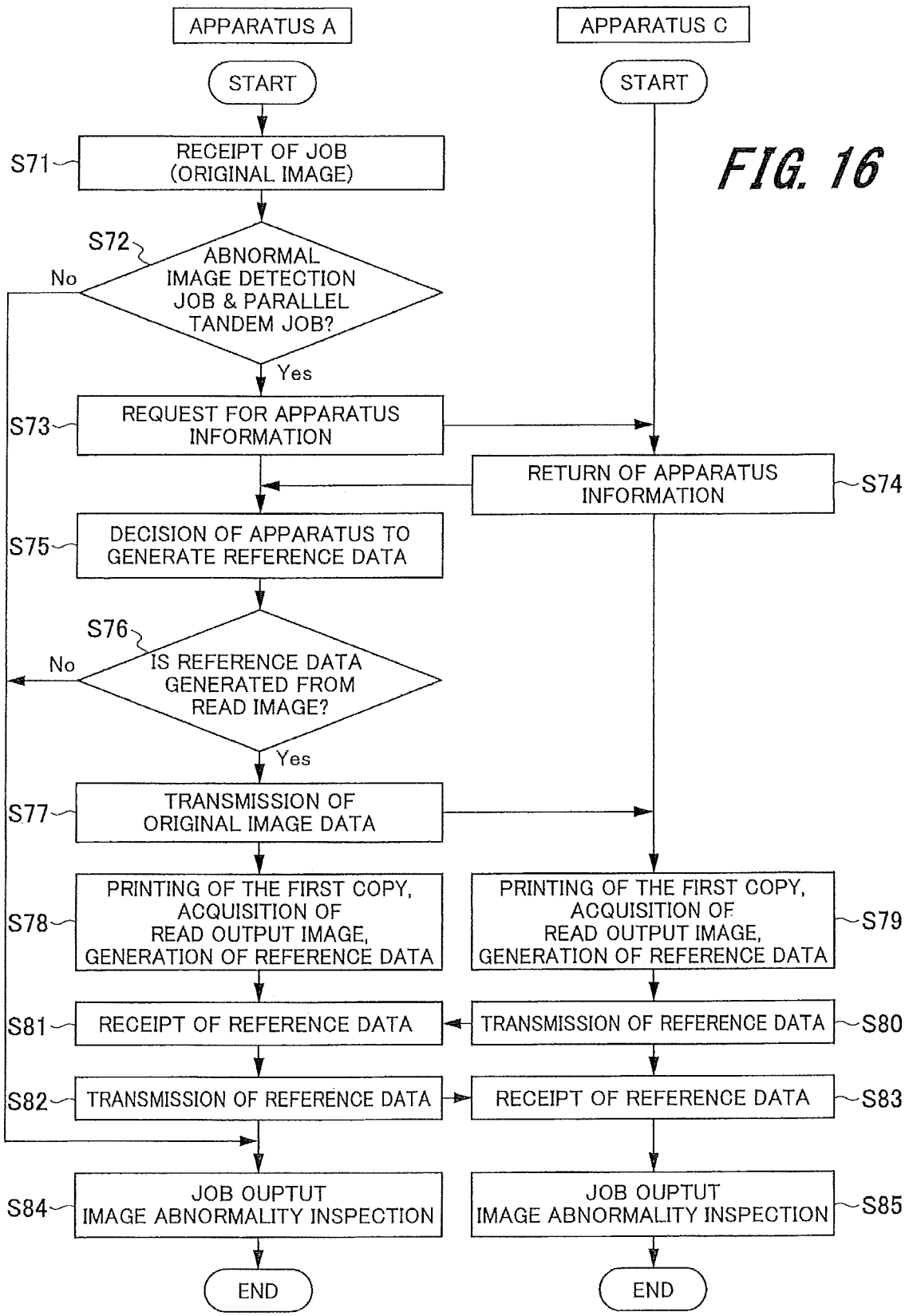
FIG. 16 is a flowchart which shows an example of the sequence of job output processing by an image forming system according to a fourth embodiment of the present invention.

FIG. 16 is a flowchart which shows an example of the sequence of job output processing by the image forming system according to the fourth embodiment. In the example shown in FIG. 16, it is assumed that parallel tandem output (distributed printing) is to be performed by two image forming apparatuses 2 (apparatus A and apparatus C) and the apparatuses A and C are preset for tandem output on the TANDEM SETUP screen 60 shown in FIG. 6. In this example, the print controller 160 (FIG. 8) of the apparatus A receives a parallel tandem job.

First, when the apparatus A receives a job (original image) (S71), the apparatus A determines whether or not the received job is an abnormal image detection job and a parallel tandem job (S72). If the apparatus A determines that the received job is not an abnormal image detection job and a parallel tandem job (No at S72), the sequence goes to Step S84 and the apparatus A performs output of the job by itself. If the apparatus A determines that the received job is an abnormal image detection job and a parallel tandem job (Yes at S72), it requests the apparatus C as the partner for parallel tandem output to send back apparatus information (existence or nonexistence of a reserved job, hardware resource information) (S73). The apparatus C, which has received the request for apparatus information from the apparatus A, returns the information on the own apparatus to the apparatus A (S74). Then, the apparatus A, which has received the apparatus information from the apparatus C, determines the apparatus to generate reference data on the basis of the own apparatus information and the apparatus information received from the apparatus C (S75).

Then, the generating apparatus determiner 105 of the apparatus A determines whether or not the received job is a job for which reference data is generated from a read output image (S76). If the job is not a job for which reference data is generated from a read output image (No at S76), the sequence goes to Step S84 to perform output of the job. In this example, it is assumed that the job contains an instruction to generate reference data from a read output image.

On the other hand, if the job is a job for which reference data is generated from a read output image (Yes at S76), the generating apparatus determiner 105 of the apparatus A sends the original image data to the apparatus C (S77). At this time, the apparatus A also sends page information on the reference data to be generated by the apparatus C as the original image receiving apparatus. Then, each of the apparatuses A and C prints the first copy of the parallel tandem job on the basis of the original image data of the job and generates reference data from the read output image acquired by the reading unit 20 (installed at the back side of the apparatus) reading the output image (S78, S79). The reference data generator 106 of each of the apparatuses A and C selects reference data to be generated by each apparatus according to the reference data generation page information and generates the reference data.

Then, the apparatus C sends the reference data generated by it to the apparatus A (S80) and the apparatus A receives the reference data from the apparatus C (S81). The apparatus A also sends the reference data generated by it to the apparatus C (S82) and the apparatus C receives the reference data from the apparatus A (S83).

Then, the apparatuses A and C perform output of the job and conduct an image abnormality inspection (S84, S85). When job output for all the original images is finished, the apparatuses A and C end the processing sequence. In the present embodiment, for the second and subsequent copies, the image abnormality inspection section 104 compares the output result (output image) not against the original image but against the read output image obtained by the reading unit 20 reading the first copy of output image.

Even in this case, the reference data may be shared by the apparatuses to perform parallel tandem output. In the above example, when the apparatuses A and C perform a parallel tandem job, for example, the apparatus C generates reference data corresponding to 70% of the pages from the last page in the original image data and the apparatus A generates reference data corresponding to 30% of the pages from the first page in the original image data. Since the print speed of the apparatus C is higher than that of the apparatus A (see FIG. 13), the reading unit 20 at the back side of the apparatus acquires the read output image in the apparatus C earlier than in the apparatus A. Therefore, the apparatus A generates pages corresponding to the former part of the original image data and the apparatus C generates pages corresponding to the latter part so that the apparatuses A and C can finish generation of reference data at the same time. After that, the reference data generated by the apparatuses A and C can be shared, so downtime can be shorter than when each apparatus generates reference data.

In the above first to fourth embodiments, the reference data required to inspect an output image in a plurality of image forming apparatuses to perform distributed processing is generated by one or more of the image forming apparatuses. In other words, the reference data to be used by several image forming apparatuses is generated by one or more of the image forming apparatuses and the reference data is made available among the image forming apparatuses to share the resources of the image forming apparatuses. Consequently, when a plurality of image forming apparatuses perform distributed printing, reference data can be efficiently generated.

<5. Fifth Embodiment>

Although an edge image is taken as an example of reference data in the first to fourth embodiments, instead reference data may be data showing a variable data area. Variable printing is to perform printing according to variable data so that pages are printed with the same layout and different contents. Typical variable printing is address printing for direct mails. A variable data area is an area in a page where variable data exists. In the fifth embodiment, data which shows a variable data area is used as data representing an area not subject to inspection in an output image so that the accuracy in image abnormality inspection is improved.

FIG. 17 is an explanatory drawing which shows an example of reference data according to the fifth embodiment.

FIG. 17 shows an example of the front surface of a postcard 80. The sender post code field 81*b* and address/name field 84 are fixed data areas. On the other hand, the addressee post code field 81*a*, address field 82, and name field 83 are variable data areas.

The data analyzer 101 determines whether or not the received job is a variable printing job. If it is determined that the job is a variable printing job, the reference data generator 106 performs character recognition processing of the original image. In this example, the reference data generator 106 is character recognition software. The reference data generator 106 defines an area in the original image where characters have been recognized by character recognition processing, as a variable data area, and specifies it as an area not subject to inspection in the output image. When data representing an area not subject to inspection in the output image, such as a variable data area, is used as reference data for image abnormality inspection, the same advantageous effects can be achieved as in the first to fourth embodiments.

In the example shown in FIG. 17, variable data areas are expressed as rectangles by chain lines; however, instead, a variable data area (data representing an area not subject to inspection in the output image) may be characters recognized by a character recognition function.

<6. Other Embodiments>

The reading function of the reading unit 20 may be incorporated in the image forming apparatus main unit 10. For example, the first CCD 21a and second CCD 21b may be located between the downstream side of the bifurcation point leading to the reversal section 17 in the conveyance path 13 of the image forming apparatus main unit 10 and the delivery port of the image forming apparatus main unit 10.

Furthermore, the present invention is not limited to the above embodiments. Obviously the invention may be embodied in other various ways without departing from the gist of the present invention as described in the appended claims.

In the description of the above embodiments, details of the apparatus and system configurations have been given concretely for easy understanding of the present invention; however the present invention is not limited to an apparatus or system which includes all the elements described above. An element of one embodiment may be replaced by an element of another embodiment or an element of one embodiment may be added to another embodiment. For each embodiment, addition, deletion, or replacement of an element can be made.

The above configurations, functions, processors, processing means and so on may be, in part or in whole, implemented by hardware such as an integrated circuit. Although embodiments of the present invention have been described and illustrated in detail, the disclosed embodiments are made for purposes of illustration and example only and not limitation. The scope of the present invention should be interpreted by terms of the appended claims.

REFERENCE SIGNS LIST

1 . . . image forming system,
2 . . . image forming apparatus,
10 . . . image forming apparatus main unit (image forming section),
20 . . . reading unit (reader),
50 . . . server,
51 . . . data analyzer,
100 . . . main unit controller,
103 . . . job output section,
104 . . . image abnormality inspection section,
105 . . . reference data generating apparatus determiner,
106 . . . reference data generator

What is claimed is:

1. An image forming system in which distributed processing of a job is performed by a plurality of image forming apparatuses and each image forming apparatus inspects an output image formed on paper by the distributed processing, each of the image forming apparatuses comprising:
an image forming section for forming the output image on the paper according to original image data of the job;
a reader for reading the output image formed on the paper and generating read image data; and
an inspection section for inspecting the output image using the original image data, the read image data, and data for abnormal image detection as a reference for detection of an abnormal image, wherein
each of the image forming apparatuses has a detection data generator for generating the data for abnormal image detection, and the data for abnormal image detection which is required to inspect the output image in the image forming apparatuses to perform the distributed processing is generated by one or more of the image forming apparatuses,
at least one of the image forming apparatuses acquires information on each image forming apparatus as apparatus information from the own apparatus and other image forming apparatuses and has a generating apparatus determiner for determining an image forming apparatus to generate the data for abnormal image detection according to the apparatus information,
the generating apparatus determiner of an image forming apparatus which has received the job determines an image forming apparatus to generate the data for abnormal image detection according to received information concerning conditions of the image forming apparatuses and sends a request to generate the data for abnormal image detection and the original image data to the determined image forming apparatus, and
the image forming apparatus which has received the request to generate the data for abnormal image detection generates the data for abnormal image detection from the received original image data through the detection data generator and sends the generated data for abnormal image detection to the other image forming apparatuses to perform the distributed processing.

2. The image forming system according to claim 1, wherein the generating apparatus determiner of the image forming apparatus which has received the job acquires information on a reserved job for each image forming apparatus as the apparatus information from the own apparatus and the other image forming apparatuses and determines an image forming apparatus having no reserved job to be an image forming apparatus to generate the data for abnormal image detection.

3. The image forming system according to claim 1, wherein the generating apparatus determiner of the image forming apparatus which has received the job acquires hardware resource information for each image forming apparatus as the apparatus information from the own apparatus and the other image forming apparatuses and determines an image forming apparatus to generate the data for abnormal image detection according to the hardware resource information.

4. The image forming system according to claim 1, wherein the generating apparatus determiner of the image forming apparatus which has received the job acquires information on a reserved job and hardware resource information for each image forming apparatus as the apparatus information from the own apparatus and the other image forming apparatuses and determines an image forming apparatus to generate the data for abnormal image detection according to existence or nonexistence of the reserved job and the hardware resource information.

5. The image forming system according to claim 4, wherein the generating apparatus determiner of the image forming apparatus which has received the job determines an order of priority for each image forming apparatus according to the information on a reserved job and hardware resource information for each image forming apparatus which are acquired from the own apparatus and the other image forming apparatuses and determines an assignment to each image forming apparatus to generate the data for abnormal image detection according to the order of priority.

6. The image forming system according to claim 5, wherein the generating apparatus determiner determines an assignment to each image forming apparatus for output in the distributed processing according to the assignment to each image forming apparatus to generate the data for abnormal image detection.

7. The image forming system according to claim 1, wherein the detection data generator of each image forming apparatus to perform the distributed processing generates the data for abnormal image detection from the read image data generated by reading the output image formed on the paper.

8. The image forming system according to claim 1, further comprising:
a server connected to the plural image forming apparatuses through a network in a communicable manner, wherein
the server, which has received the distributed processing job, sends a request to determine the image forming apparatus to generate the data for abnormal image detection to an image forming apparatus having the generating apparatus determiner, and
upon receipt of a result of decision as a reply from the image forming apparatus having the generating apparatus determiner, the server sends the request to generate the data for abnormal image detection and the original image data to the image forming apparatus to generate the data for abnormal image detection.

9. The image forming system according to claim 1, wherein the data for abnormal image detection contains data representing an edge position in the output image.

10. The image forming system according to claim 1, wherein the data for abnormal image detection contains data representing a position not subject to the inspection in the output image.

11. A non-transitory recording medium storing a computer-readable program causing a computer of an image forming apparatus which has received the job, among a plurality of image forming apparatuses to perform distributed processing of a job, to perform:
acquiring information on each image forming apparatus as apparatus information from the own apparatus which has received the job, and other image forming apparatuses;
determining an image forming apparatus to generate data for abnormal image detection as a reference for detection of an abnormal image according to the received apparatus information; and
sending a request to generate data for abnormal image detection and original image data of the job to the determined image forming apparatus.

12. A non-transitory recording medium storing a computer-readable program causing a computer of each image forming apparatus of a plurality of image forming apparatuses to perform distributed processing of a job to perform:
receiving a request for apparatus information as information on another image forming apparatus from an image forming apparatus which has received the job;
returning the apparatus information on the own apparatus as a reply to the request for apparatus information;
receiving a request to generate data for abnormal image detection as a reference for detection of an abnormal image and original image data of the job from the image forming apparatus which has received the job;
generating the data for abnormal image detection from the original image data; and
sending the generated data for abnormal image detection to other image forming apparatuses to perform the distributed processing.

13. A non-transitory recording medium storing a computer-readable program causing a computer of a server connected to a plurality of image forming apparatuses to perform distributed processing of a job in a communicable manner through a network to perform:
receiving the distributed processing job;
sending a request to determine an image forming apparatus to generate data for abnormal image detection as a reference for detection of an abnormal image to a given image forming apparatus, wherein each of the image forming apparatuses has a detection data generator for generating the data for abnormal image detection, and at least one of the image forming apparatuses acquires information on each image forming apparatus as apparatus information from the own apparatus and other image forming apparatuses and determines the image forming apparatus to generate the data for abnormal image detection according to the apparatus information; and
receiving a result of decision as a reply from the given image forming apparatus and sending a request to generate the data for abnormal image detection and original image data of the job to the image forming apparatus to generate the data for abnormal image detection, wherein the image forming apparatus which has received the job determines an image forming apparatus to generate the data for abnormal image detection according to received information concerning conditions of the image forming apparatuses and sends the request to generate the data for abnormal image detection and the original image data to the determined image forming apparatus, and the image forming apparatus which has received the request to generate the data for abnormal image detection generates the data for abnormal image detection from the received original image data and sends the generated data for abnormal image detection to the other image forming apparatuses to perform the distributed processing.

* * * * *